United States Patent [19]

Ward et al.

[11] E Patent Number: Re. 31,888

[45] Reissued Date of Patent: May 14, 1985

[54] SENSOR CONTROLLING IN COMPUTER FANFOLD REPRODUCTION

[75] Inventors: Joseph W. Ward, Pittsford; Russell G. Schroeder, II, Rochester, both of N.Y.

[73] Assignee: Xerox Corporation, Stamford, Conn.

[21] Appl. No.: 512,808

[22] Filed: Jul. 11, 1983

Related U.S. Patent Documents

Reissue of:

[64] Patent No.: 4,320,960
Issued: Mar. 23, 1982
Appl. No.: 75,868
Filed: Sep. 17, 1979

[51] Int. Cl.[3] ..... G03G 15/00

[52] U.S. Cl. ..... 355/14 R; 355/14 SH; 355/75

[58] Field of Search ..... 355/3 R, 3 SH, 14 R, 355/14 SH, 16, 75

[56] References Cited

U.S. PATENT DOCUMENTS

| | | | |
|---|---|---|---|
| 3,374,873 | 3/1968 | Takenaka | 197/49 |
| 3,446,554 | 5/1969 | Hitchcock et al. | 355/75 |
| 3,804,514 | 4/1974 | Jasinski | 355/75 |
| 3,829,082 | 8/1974 | Hoyer | 271/4 |
| 3,989,368 | 11/1976 | Sohm | 355/14 R |
| 3,994,426 | 11/1976 | Zahradnik et al. | 226/51 |
| 3,997,093 | 12/1976 | Aizawa et al. | 226/11 |
| 4,025,186 | 5/1977 | Hunt et al. | 355/16 X |
| 4,054,380 | 10/1977 | Donohue et al. | 355/14 |
| 4,087,172 | 5/1978 | Van Dongen | 355/14 SH |

OTHER PUBLICATIONS

Gustafson, Gary B., "Apparatus for Registering and Feeding Documents", Research Disclosure, Sep. 1978, pp. 40–43.

*Primary Examiner*—Fred L. Braun
*Attorney, Agent, or Firm*—Bernard A. Chiama

[57] ABSTRACT

An automatic duplicating system in which computer fanfold documents are fed by an automatic handling apparatus having a tractor and drive control system for advancing the document across the platen of the processor for the system. An arrangement is provided which will shut down the system in the event there is a break in the fanfold material during a reproduction run or the end of the document has been attained during normal operation. Sensing devices are utilized in the path of movement of the document and a circuit is provided to produce a train of pulses in accordance with the movement of the document. The frequency of the train of pulses is compared with a reference frequency to insure proper operation.

18 Claims, 33 Drawing Figures

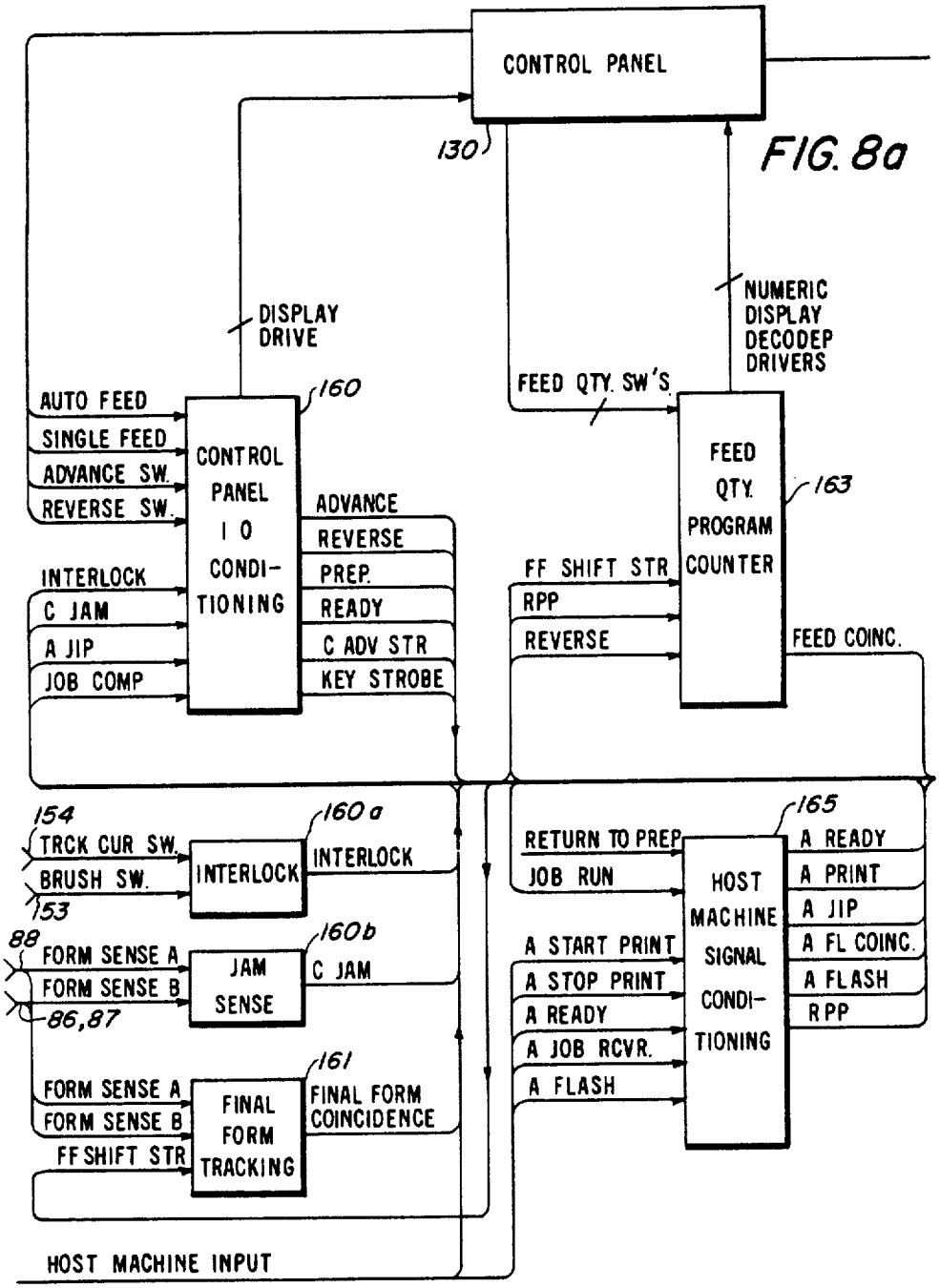
CONTROL PANEL
130
FIG. 8a
DISPLAY DRIVE
NUMERIC DISPLAY DECODEP DRIVERS
FEED QTY. SW'S
160
AUTO FEED
SINGLE FEED
ADVANCE SW.
REVERSE SW.
CONTROL PANEL I O CONDI-TIONING
ADVANCE
REVERSE
PREP.
READY
C ADV STR
KEY STROBE
INTERLOCK
C JAM
A JIP
JOB COMP
FEED QTY. PROGRAM COUNTER
163
FF SHIFT STR
RPP
REVERSE
FEED COINC.
154
TRCK CUR SW.
BRUSH SW.
153
INTERLOCK
160a
INTERLOCK
88
FORM SENSE A
FORM SENSE B
86,87
JAM SENSE
160b
C JAM
FORM SENSE A
FORM SENSE B
FF SHIFT STR
FINAL FORM TRACKING
161
FINAL FORM COINCIDENCE
HOST MACHINE INPUT
RETURN TO PREP
JOB RUN
A START PRINT
A STOP PRINT
A READY
A JOB RCVR.
A FLASH
HOST MACHINE SIGNAL CONDI-TIONING
165
A READY
A PRINT
A JIP
A FL COINC.
A FLASH
RPP 163
STOP CYCLE
162
P.Q. COINC.
P.Q.≠0
C 13 D
B 13
C 22 A
P.Q. CONCIDENCE
CYCLE UP
CYCLE OUT
C 24 A
C 25 A
B 21
163a
U 12
CO
U 11
U 10
SIP + JIP + INIT
RAP
165
C 17 A
T 9
+20V
Q 9
160
1
2
4
8
10
20
40
80
100
200
400
800
163c 16/28
166
167
C10
C10
FORM LENGTH
PRECOINCIDENCE
B19
B19
B6
B1
B8
(CLOCK/100)
(START FORM MOVE CYCLE)
B9
RECYCLE
B9
START FORM MOVE CYCLE
PQ COUNT/ FF SHIFT STORAGE
JOB STATUS STROBE
B13
(HIS)
+12V
STEP CLOCK/100
8
4
2
1
0.5
166a
B6
B8
+12V
HALT
B14
B12 (1/2)
STEP COMP.
SLEW CYCLE
CLOCK 50
JOB CYCLE
HALT RESET
166b
+12V
B11
D30

DELAYED START PRINT
D14
C-JAM
CO
D28
D 9
PE
CK
HALT
Q4
Q3
34hz
A12
AUTO FEED
RPP
B 17 (1/2)
8Khz
END OF JOB
OUTPUT TIMING 164b
MS MOVE
HS MOVE
RIa
RIb
+12V
C12
VCO CLOLK
C2
2.7
14
169
REVERSE
SLOW
C30
C13
168
JOB FORM RESET
C 30
B 9
B 18
HALT RESET
C INIT
(PART OF 162)
JOB RUN
SIP+JIP +INIT
(JIP)
D-25

SENSOR CONTROLLING IN COMPUTER FANFOLD REPRODUCTION

Matter enclosed in heavy brackets [ ] appears in the original patent but forms no part of this reissue specification; matter printed in italics indicates the additions made by reissue.

Companion patent applications to the above-entitled application and filed on even date herewith are as follows: Ser. No. 075,870, entitled Computer Fanfold Material Frame Selection; Ser. No. 075,865, entitled Duplexing in Computer Fanfold Reproduction; Ser. No. 075,919, entitled Platen Module for Computer Fanfold Reproduction; Ser. No. 075,866, entitled Stepper Motor Drive System in Computer Fanfold Reproduction; Ser. No. 075,918, entitled Job Recovery Enhancement in Computer Fanfold Reproduction; Ser. No. 075,920, entitled Speed Control for Computer Fanfold Reproduction.

This invention relates to automatic electrostatographic duplicating machines and particularly to the improvement of handling continuous or web type document materials such as computer fanfold sheet material.

It is known to use electrostatographic reproduction machines as a dual-function machine for copying continuous length documents or individual documents by a single machine as described for example in U.S. Pat. No. 3,804,514, or in the copending patent application Ser. No. 40,334, filed May 18, 1979, and commonly assigned.

With the advent of the high speed electrostatographic duplicating machines having automatic computer fanfold document copying capability in addition to the standard document reproduction modes, there is need to permit the easy installation and removal of the fanfold handling apparatus and that the apparatus be compact and compatible with the host machine. To this end, the apparatus should comprise sub-assemblies which are individually mountable relative to the host machine, are adapted to accommodate the structural configuration thereof, and are arranged so that the web material is not displaced over too much area or requires too long a path of movement. It is also desirable that the fanfold handling apparatus be adapted to utilize all of the features that the host machine is capable of providing such as sorting, finishing and duplexing without the need for manual intervening steps.

The general combination of an electrostatographic processor and a computer fanfold web handling apparatus is not new, having been described in U.S. Pat. Nos. 3,446,554 and 3,804,514, cited above, both being assigned to the assignee of the present invention. The latter patent illustrates the basic configuration of the Xerox duplicator presently in commercial use labelled the 7700 machine. In both of these arrangements, the fanfold material is stacked in a supply bin at one end of the machine, directed across the entire top side and then collected after copying of the material into a receiver basket at the other end of the machine. In addition, neither of the disclosures, or the machine itself is provided with innovative operative features which optimize and simplify total operation, or which extends the versatility of the machine.

Another patent disclosing an apparatus for moving computer fanfold material across the platen of a copying machine is U.S. Pat. No. 3,994,426. This disclosure is directed to a drive mechanism which provides the total system with the capability of forward and reverse movements of the material as well as continuous or segment by segment driving action.

In U.S. Pat. No. 3,997,093, a computer fanfold material handling apparatus for use with a copying machine is disclosed as having a web material conveying arrangement wherein the material is directed across a platen and use is made of a tension roller to permit reverse movement of the material.

The use of a stepper motor, in some capacity, in the printing field is described in U.S. Pat. No. 3,374,873. This use, however, is directed to the rotation of a font of printing characters whereby a series of electrical pulses effect the positioning of a desired printing character into a printing position. Rudimentary controls for a computer fanfold copying machine is disclosed in U.S. Pat. No. 4,087,172. One such control is for the production of duplex copies, however, this feature is accomplished manually and requires a double pass of the computer fanfold material through the machine.

In the arrangement of the present invention, a computer fanfold handling apparatus is provided with a first sensing means arranged in the path of movement of fanfold web material adjacent the edge thereof to sense the frequency or rate of movement of the drive holes along that edge. This frequency is compared to a reference frequency in order to determine if the forms are moving as required or if the forms are not at a proper speed. In either situation, the machine will be stopped. A second sensing means is also provided in order to determine whether or not the material is present, thereby indicating that either the forms material is severed at some point, or the end of the material has been attained. If the latter situation, the number of the frame sections selected to be copied, the size of the sections, and the actual count of copies made at that time are integrated so as to determine how much further the machine will operate before shutting down as a job completion condition.

It is therefore the principal object of this invention to incorporate a new and improved computer fanfold handling apparatus into a conventional electrostatographic duplicating machine wherein control functions are made easily compatible with the host machine.

It is a further object of the present invention to enable the copying of continuous document material on a high speed electrostatographic duplicating machine simply and efficiently.

It is a further object of the present invention to control the copying of continuous type documents on a duplicating machine in response to a full compliment of operator selected modes, as is available for processing individual original documents.

These and other objects of the invention will become more apparent upon considering the following description which is to be read in conjunction with the accompanying drawings wherein.

Figure 7:
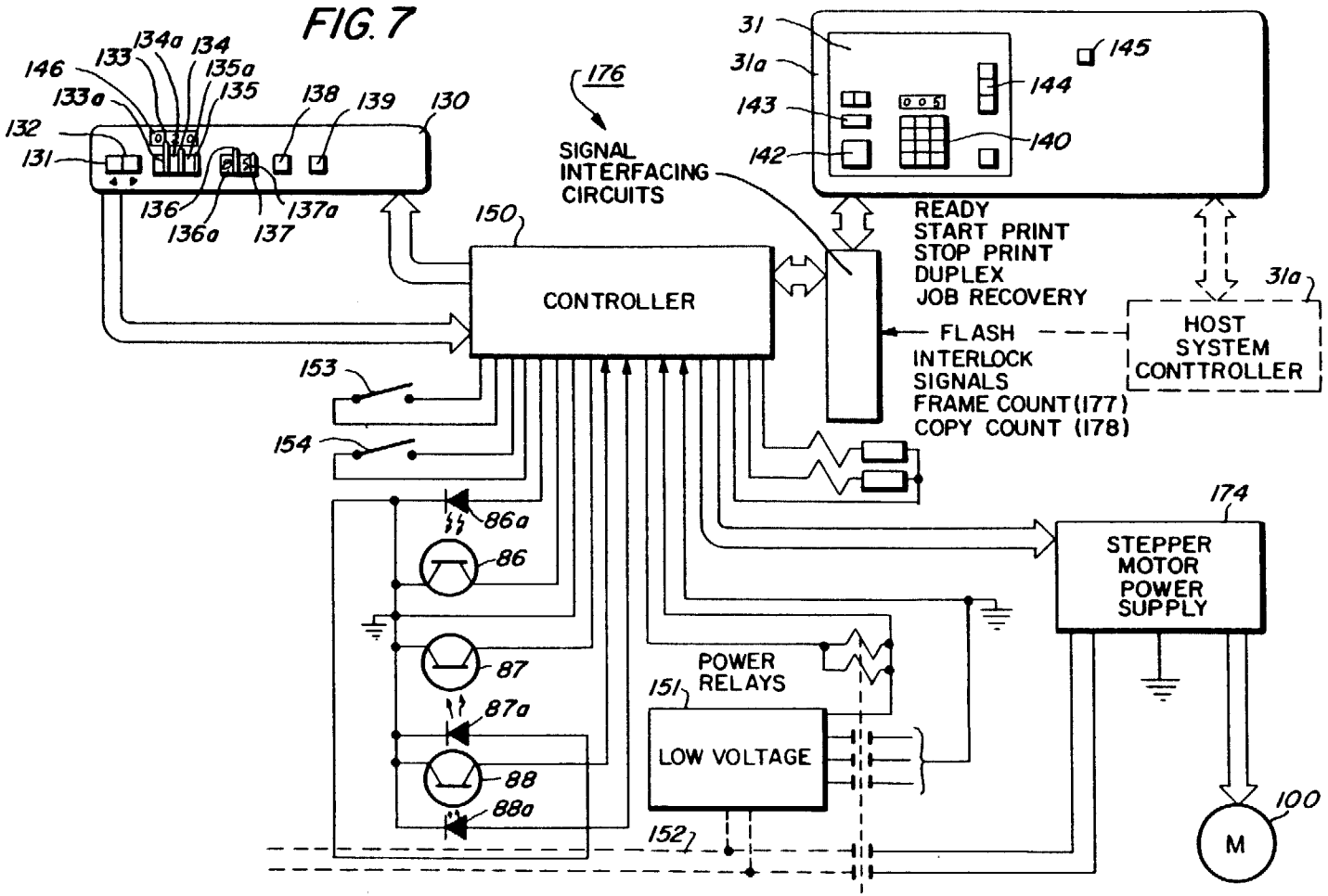
FIG. 7 is an electrical block diagram of the duplicating system.
Figure 9A:
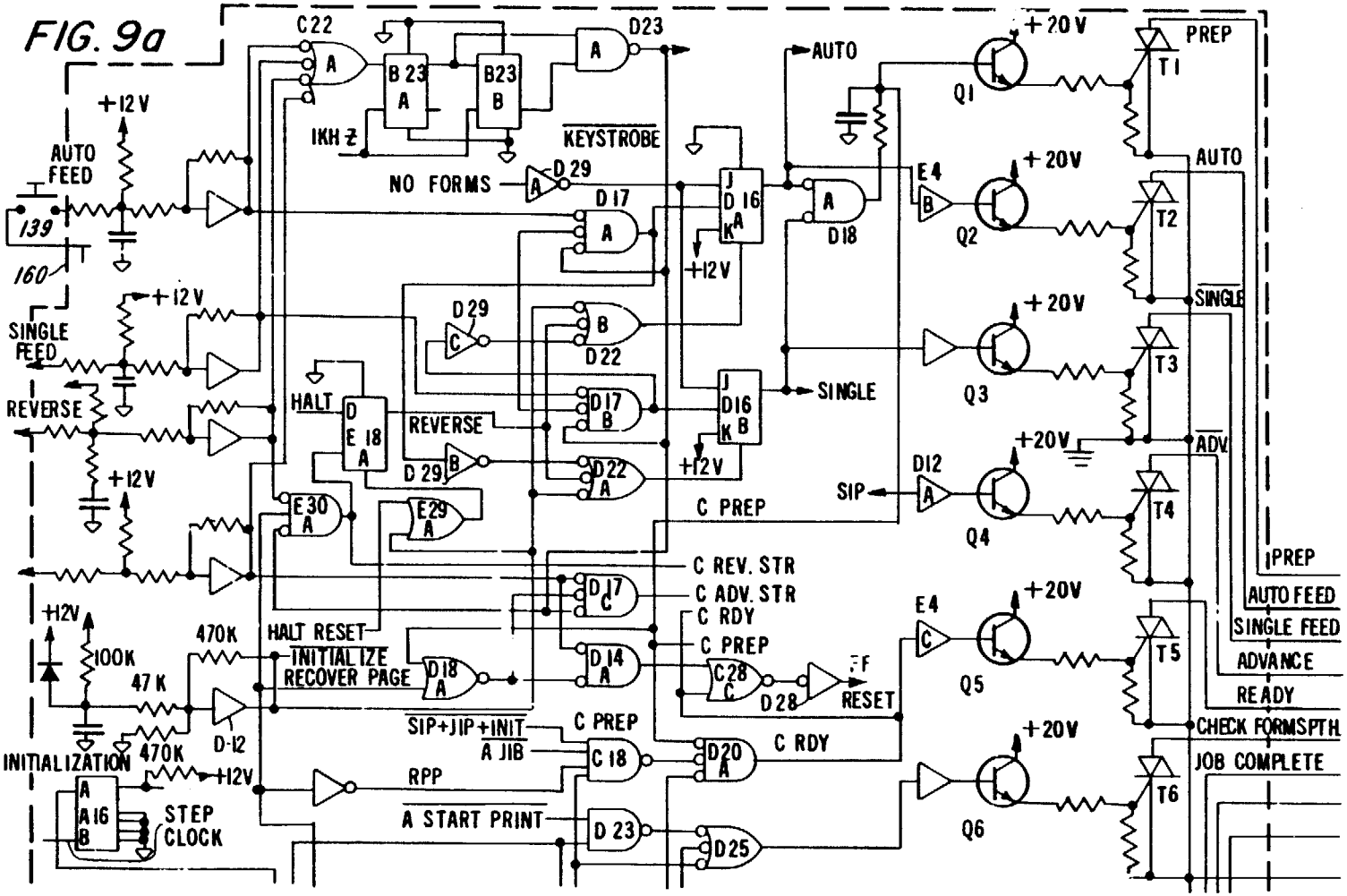
Figure 9B:
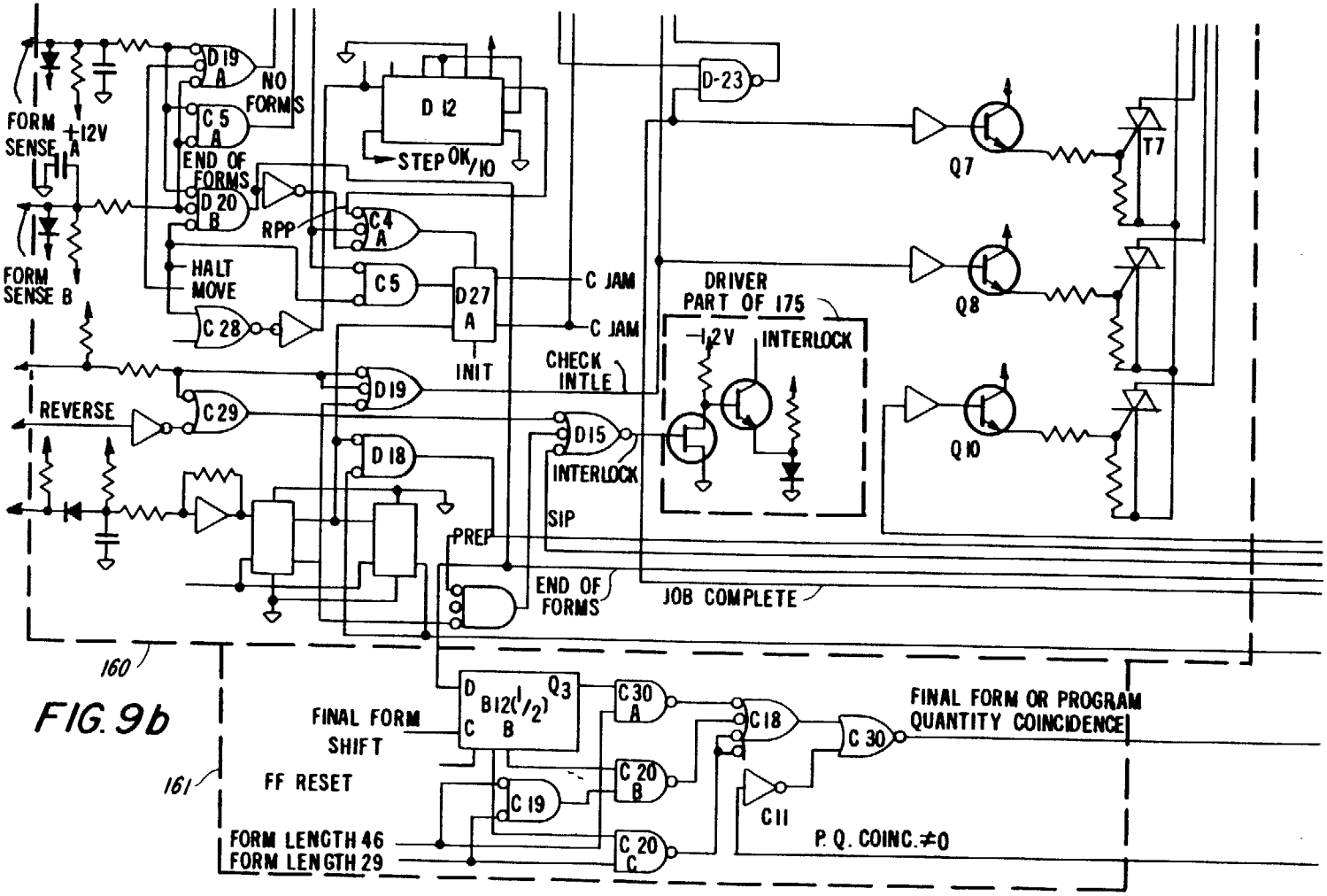
Figure 9C:
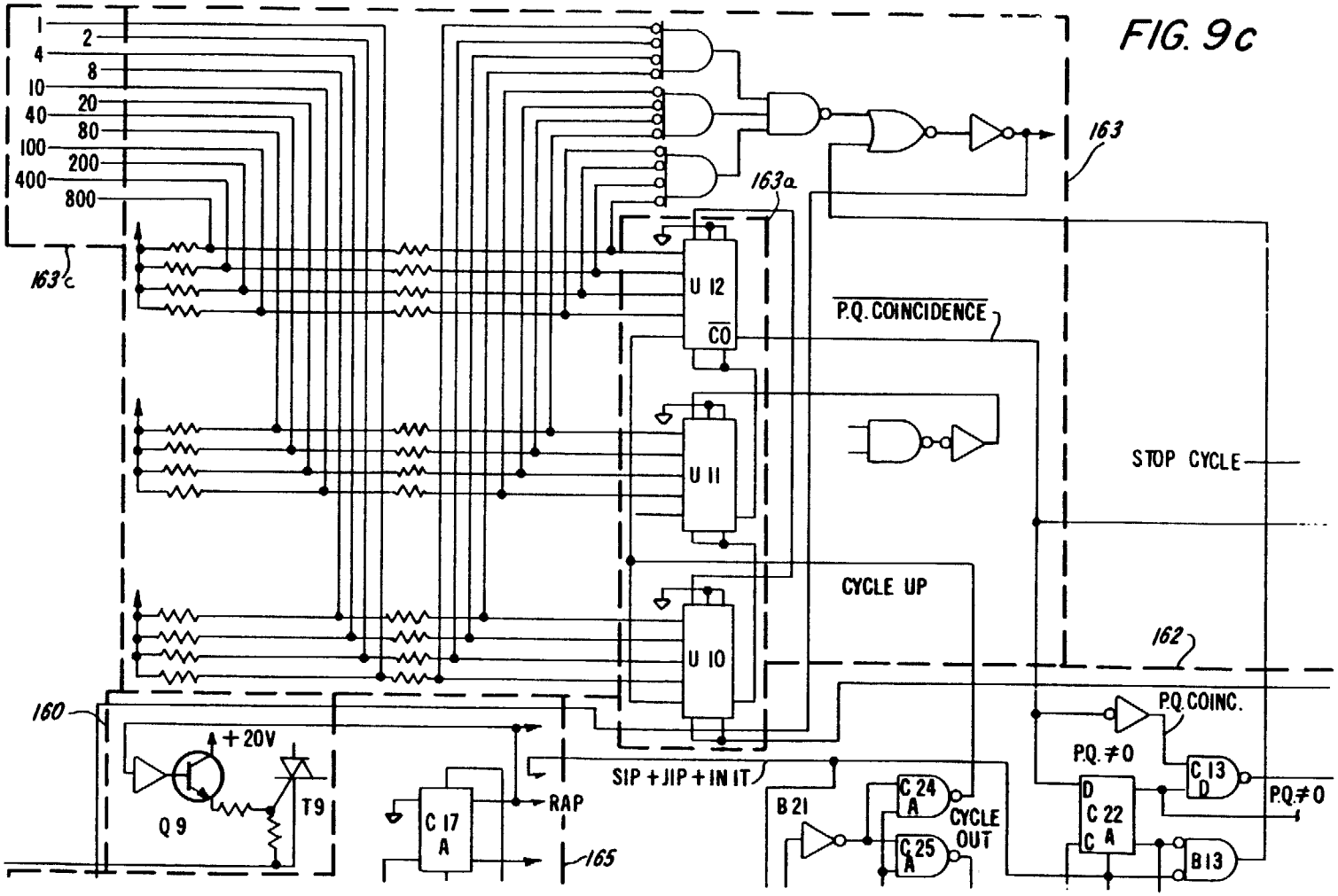
Figure 9D:
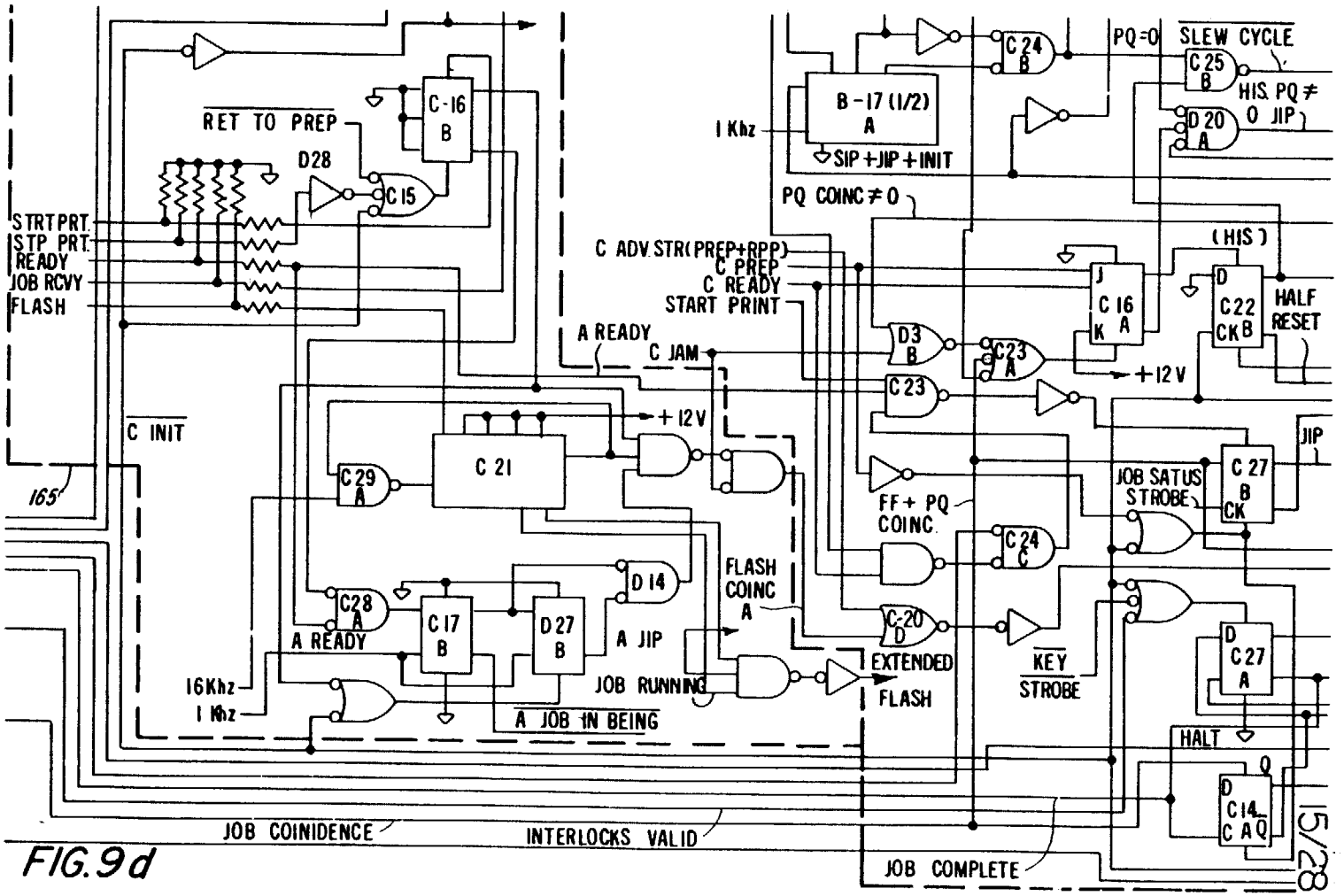
Figure 9E:
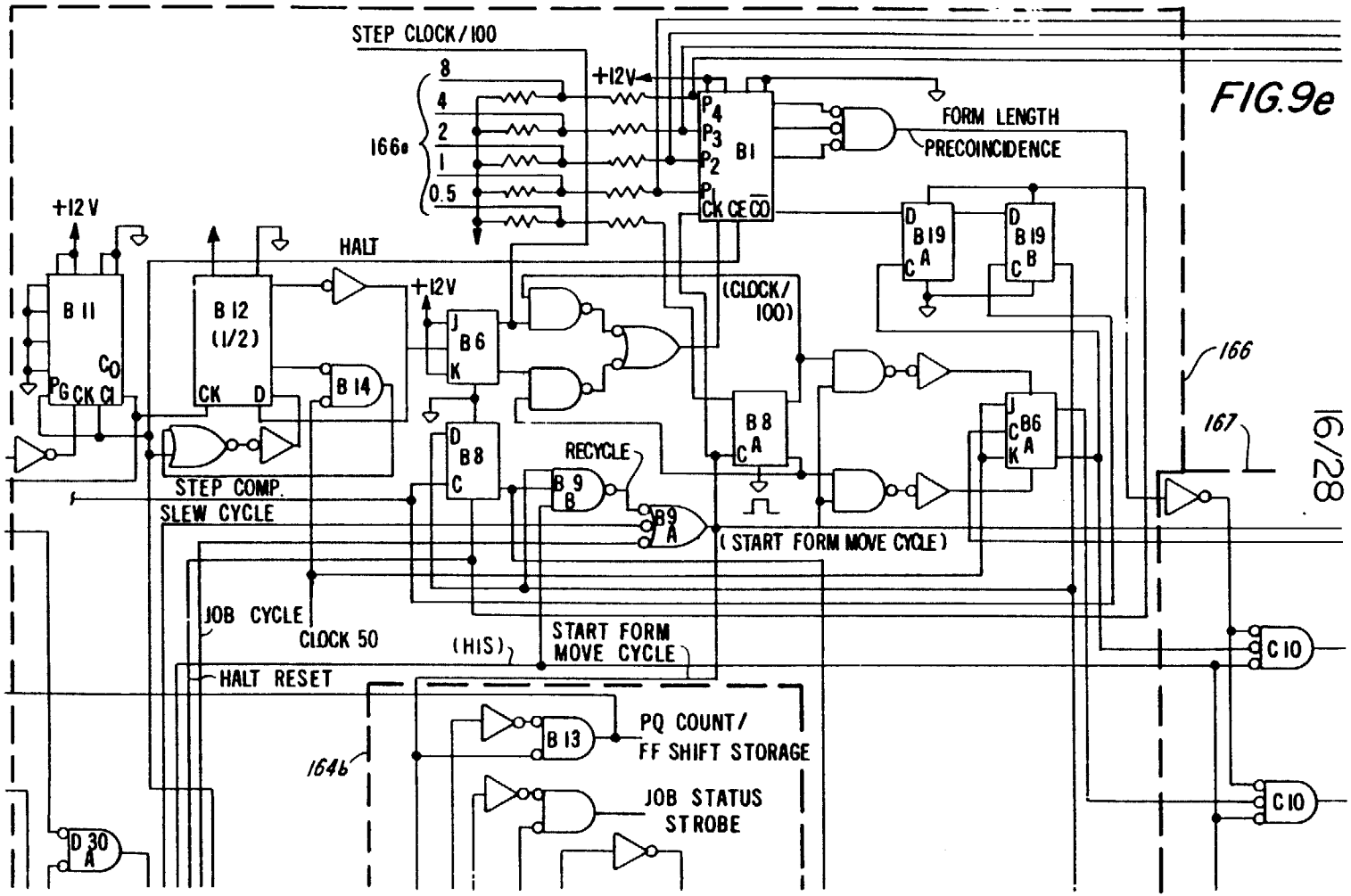
Figure 9F:
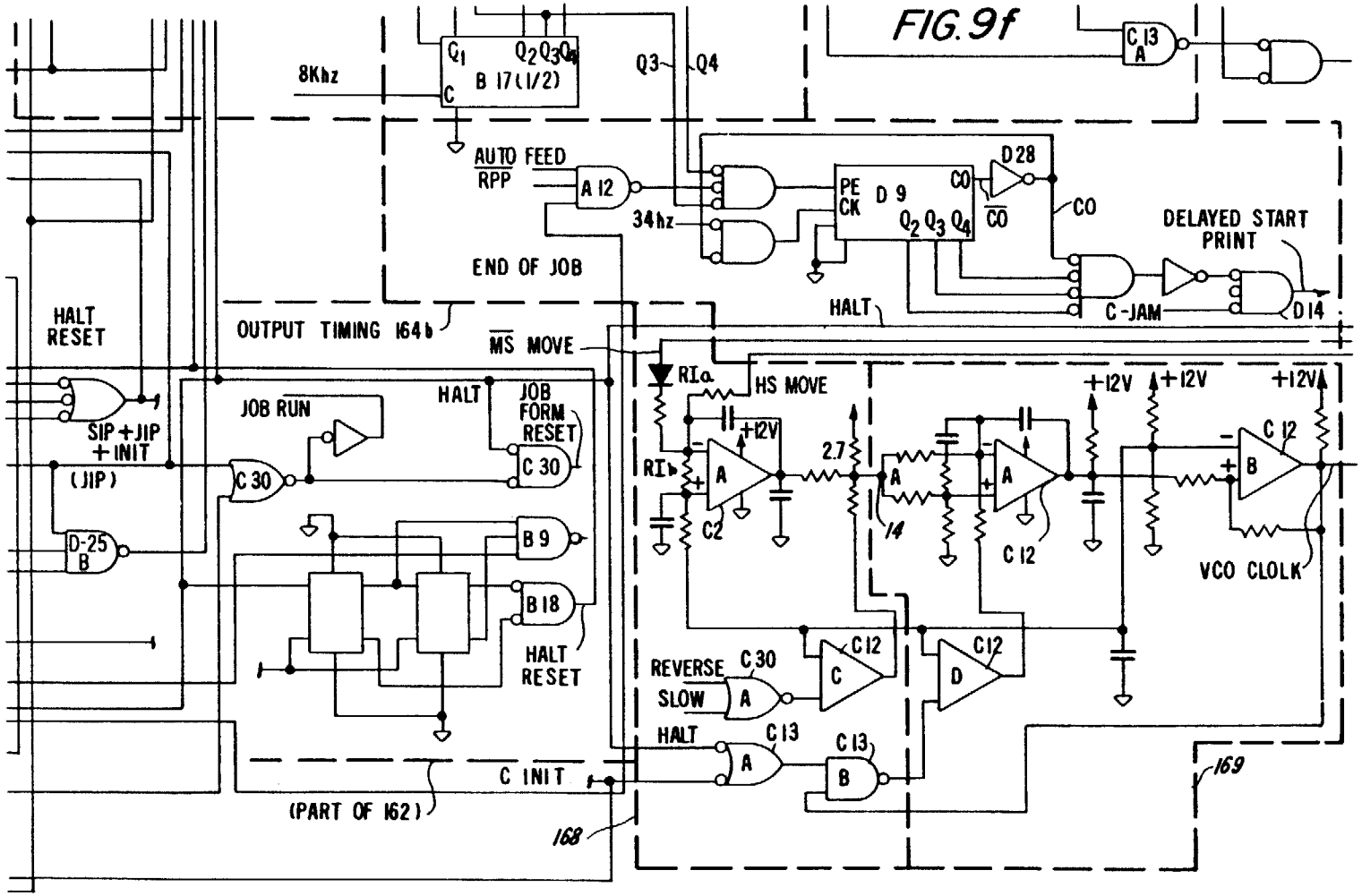
Figure 9G:
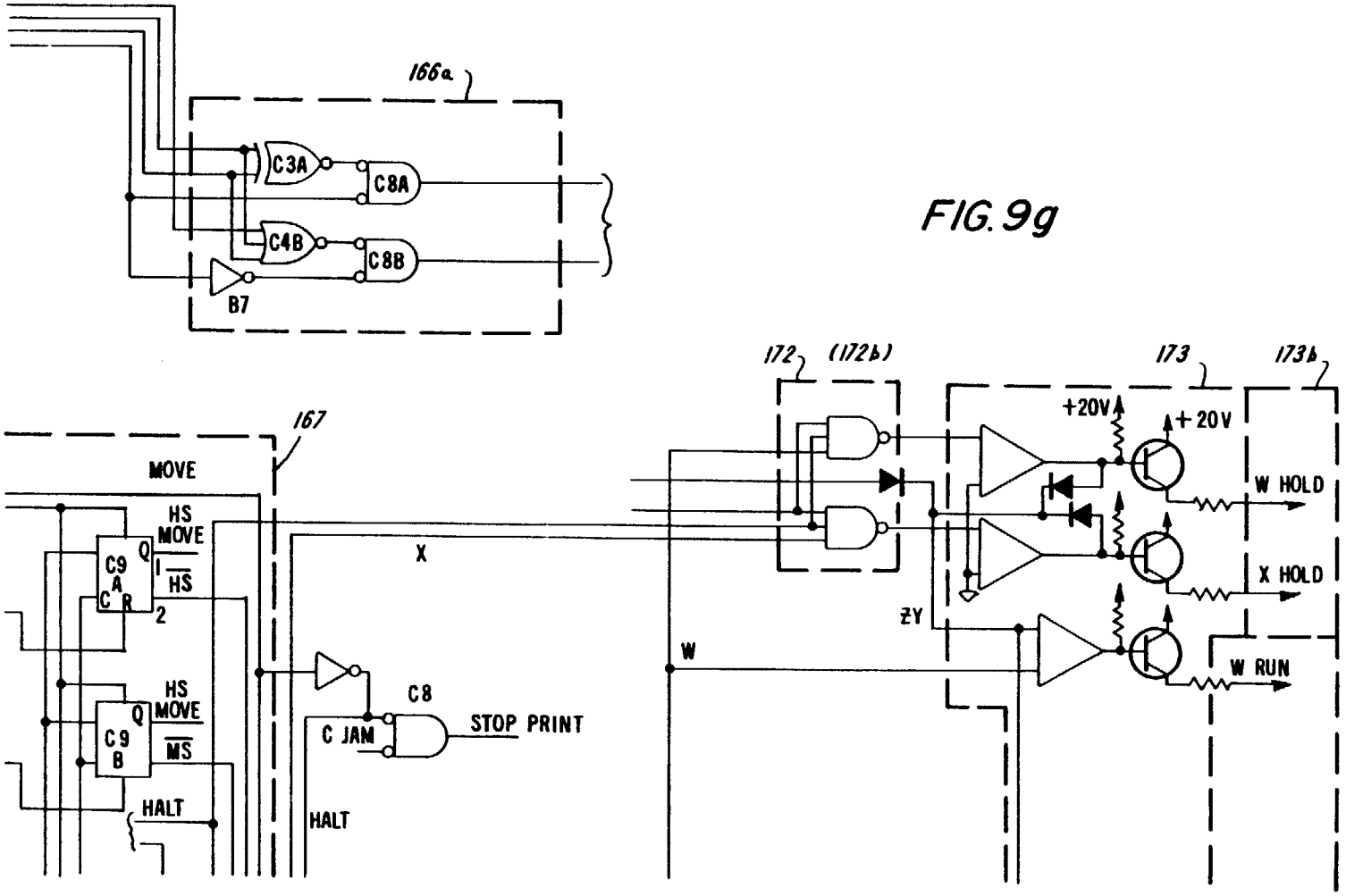
Figure 9H:
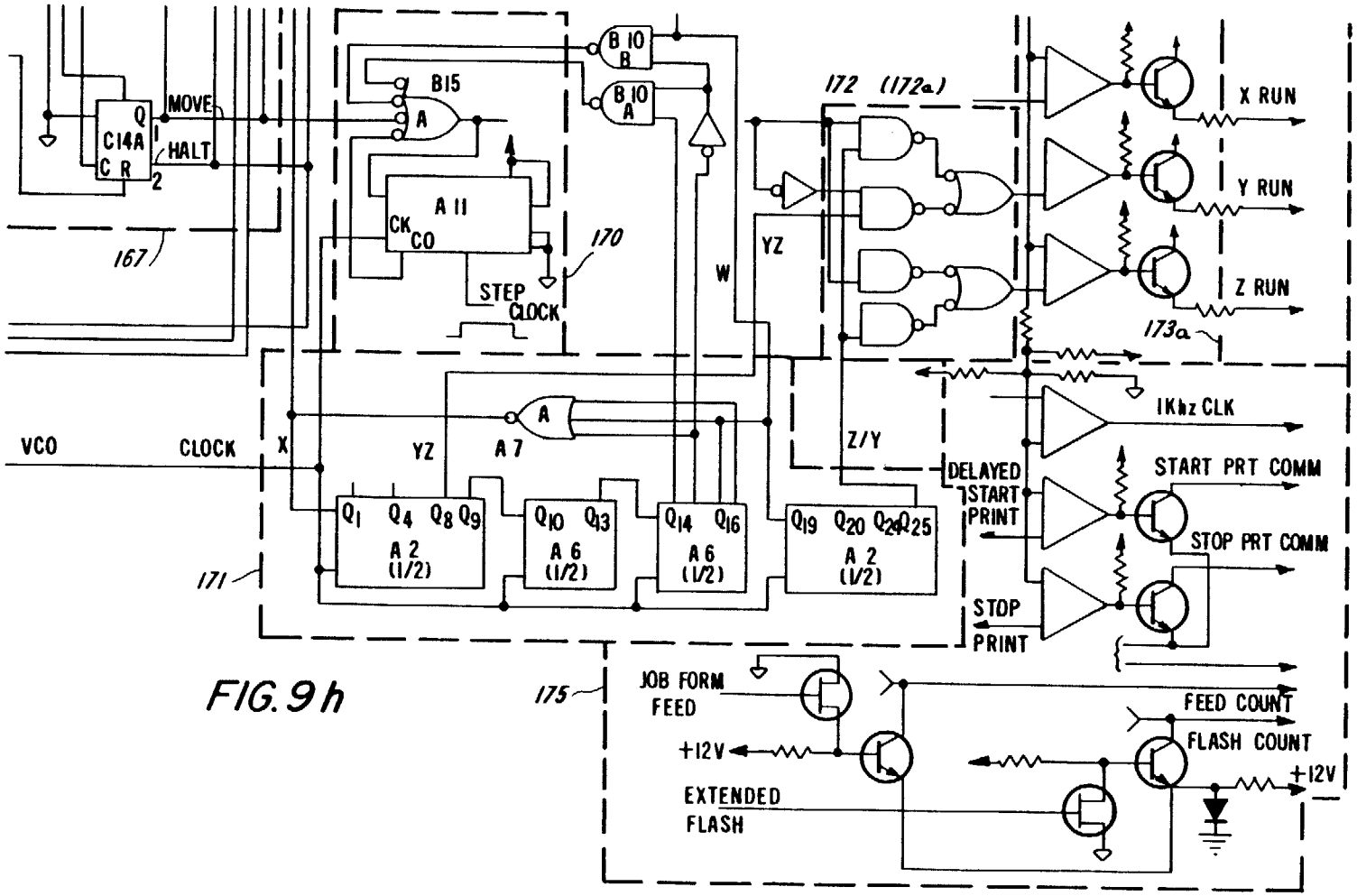
Figure 10A:
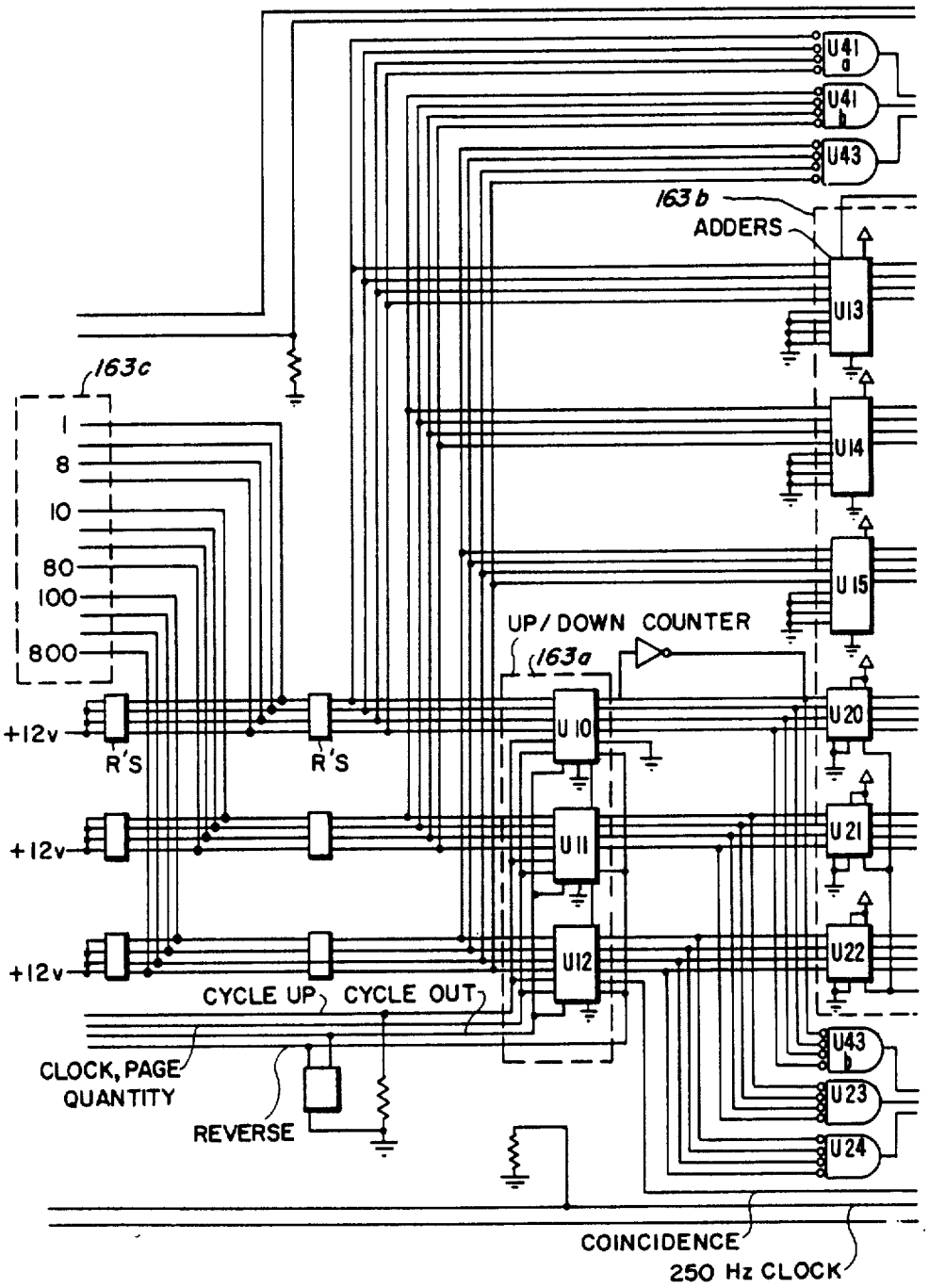
Figure 10B:
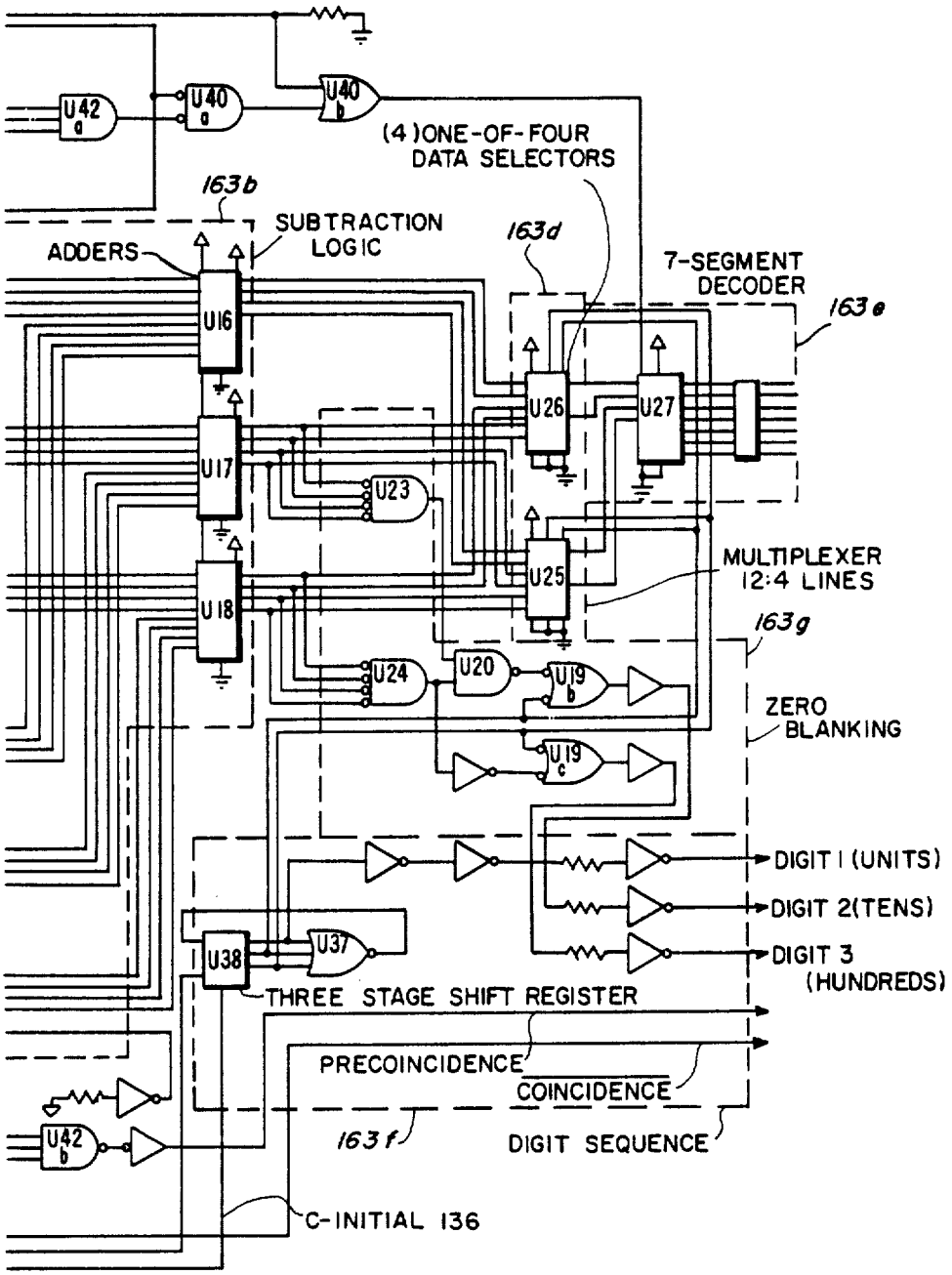
Figure 20:
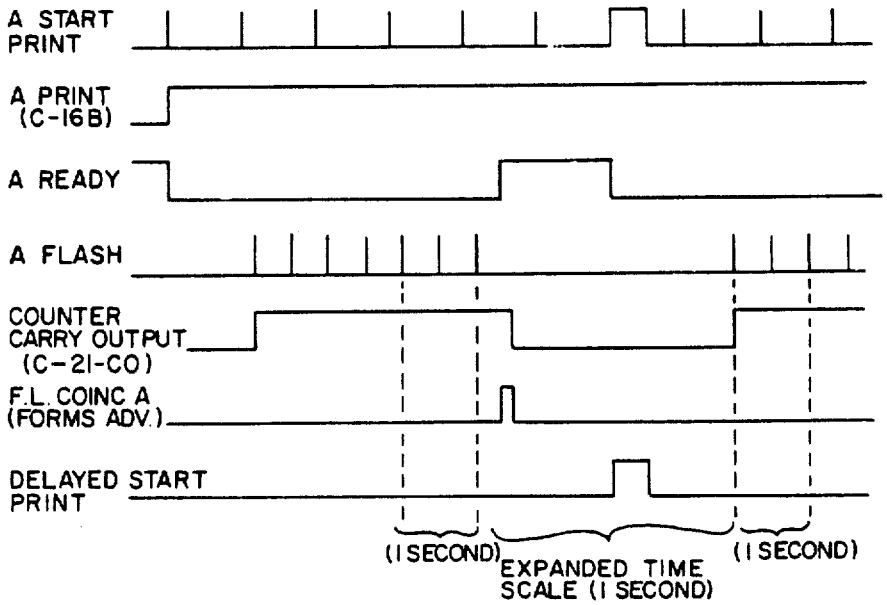
Figure 21:
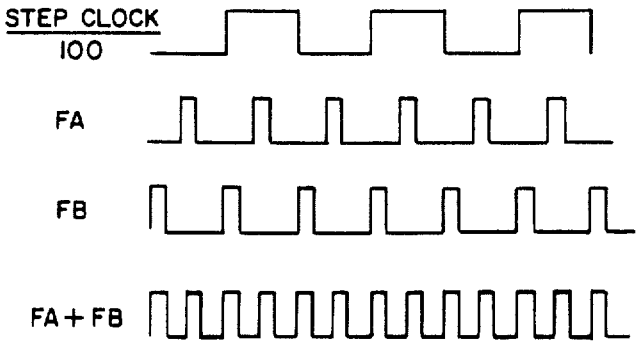
Figure 22:
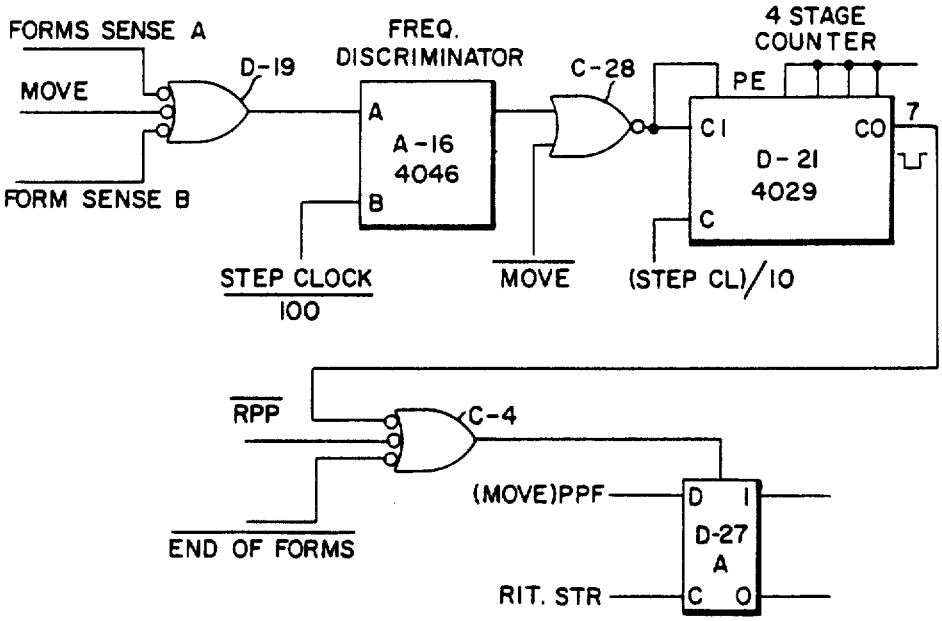

FIGS. 8a, 8b, 8c, and 8d are system control block diagrams which expand the controller of FIG. 7 and which may be joined together in end to end relation to facilitate study;

FIGS. 9a through 9h are detailed logic and circuit diagrams of the system of FIG. 8 and are arranged to be joined together to form a composite circuitry;

FIGS. 10a and 10b are detailed logic circuits of a segment of the logic of FIGS. 9a-9h and are arranged to be joined together;

FIGS. 11 through 21 are various timing charts for some of the described functions; and FIG. 22 is a partial circuit diagram of a detail in the logic circuits of FIGS. 9a-9h.

Figure 1:
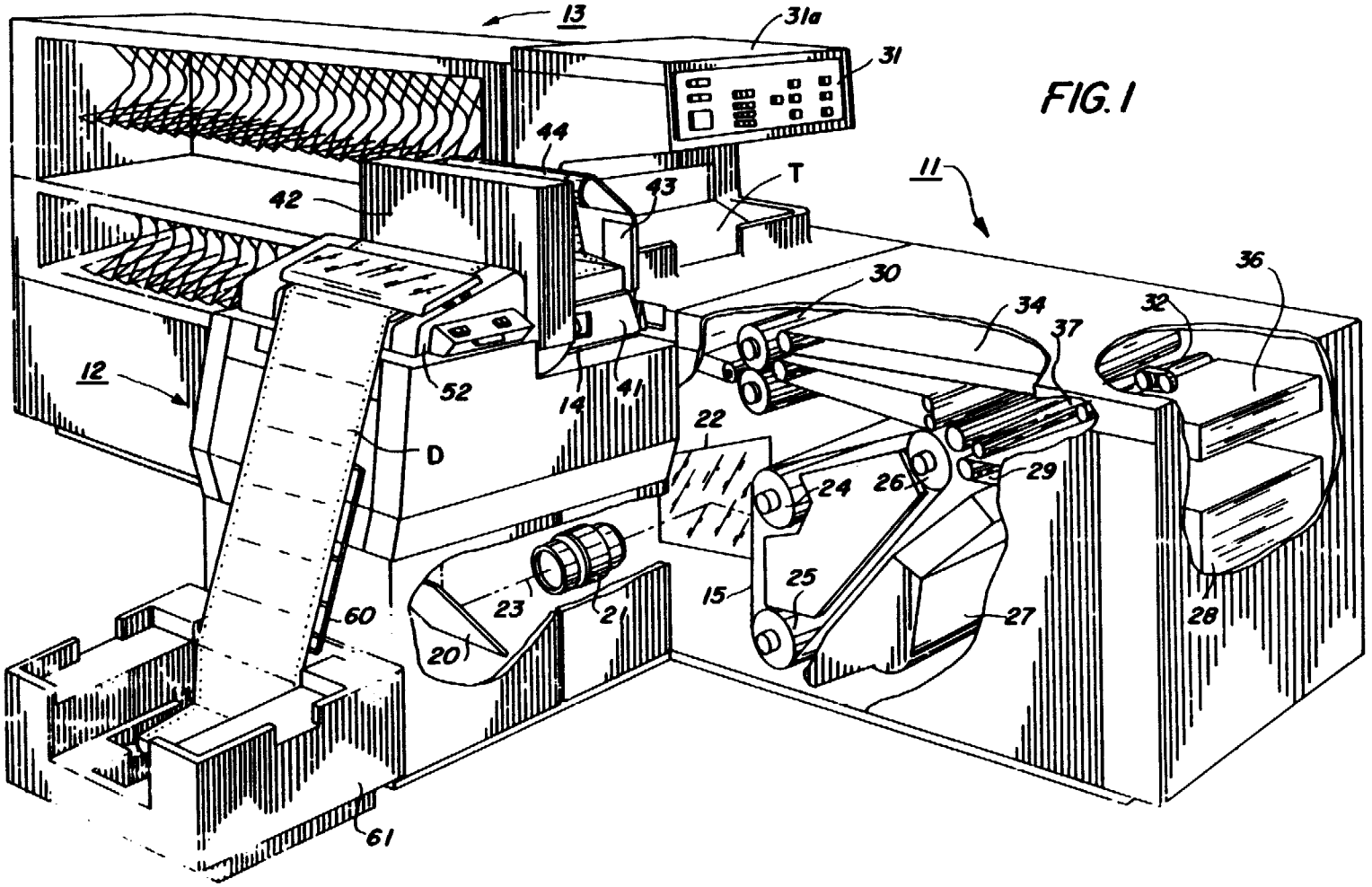
FIG. 1 is a perspective view of a duplicating system incorporating a computer fanfold material handling apparatus according to the present invention.

For a general understanding of reproduction machine with which the present invention may be incorporated, reference is made to FIG. 1 wherein components of a typical electrostatographic printing system are illustrated. The printing system is preferably of the xerographic type as one including a xerographic processor 11, a document handling apparatus 12, and a sorter arrangement 13. Preferably, the printing system 11, 12 and 13 is the commercial embodiment of the Xerox machine model 9400 which utilizes flash, full frame exposure, for very high speed production. As in all xerographic systems, a light image of an original to be reproduced is projected onto the sensitized surface of a xerographic photosensitive surface to form an electrostatic latent image thereon. Thereafter, the latent image is developed with toner material to form a xerographic powder image corresponding to the latent image on the photosensitive surface. The powder image is then electrostatically transferred to a record material such as a sheet or web of paper or the like to which it may be fused by a fusing device whereby the powder image is caused to adhere permanently to the surface of the record material.

The xerographic processor 11 is arranged as a self-contained unit having all of its processing stations located in a unitary enclosure or cabinet. The processor includes an exposure station at which a conventional document to be reproduced is positioned on a glass platen 14 for projection onto a photosensitive surface in the form of a xerographic belt 15. The document or set of individual documents is selectively transported by the document feed apparatus 12 including a transport belt from the beginning of the set of sequenced documents in the apparatus to the platen for exposure and then returned on completion of the exposure until the entire stack has been copied, at which time the document set handling cycle may be repeated indefinitely as described in U.S. Pat. No. 3,829,082 entitled "Automatic Document Handler" and commonly assigned with the present invention.

Imaging light rays from the document which is flash illuminated by suitable lamps are projected by first mirror 20 and a projection lens 21 and another mirror 22 onto the xerographic belt 15 at the focal plane for the lens 21 along a path indicated by dotted lines 23.

The xerographic belt 15 is mounted for movement around three parallel arranged rollers 24, 25, and 26 suitably mounted in the frame of processor 11. The belt is continuously driven by a suitable motor (not shown) and at an appropriate speed. The exposure of the belt to the imaging light rays from the document discharges the photoconductive layer in the area struck by light whereby there remains on the belt an electrostatic latent image corresponding to the light image projected from the document. As the belt continues its movement, the electrostatic latent image passes a developing station at which there is positioned a developer apparatus 27 for developing the electrostatic latent image. After development, the powdered image is moved to an image transfer station whereat record material or sheets of paper just previously separated from a stack of sheets 28 and transported by a conveyor 29 to the transfer station is held against the surface of the belt to receive the developed powder image therefrom. The sheet is moved in synchronism with the movement of the belt during transfer of the developed image. After transfer, the sheet of paper is conveyed to a fusing station where a fuser device 30 is positioned to receive the sheet of paper for fusing the powder thereon. After fusing, the sheet is transported selectively to a catch tray T, the sorter 13, or finisher, (not shown) or the like, alternatively, transported back into the processor for duplexing, if so desired.

The processor 11 is under control of a programmer 31 which permits an operator various options: to turn the entire system ON or OFF; to program the reproduction system for a desired number of reproductions to be made of each original document sheet, fanfold frame or panel; to select one of many different copy reduction sizes; and to select whether simplex or duplex copies are to be made. If the duplex copying mode is selected, each sheet of copy paper bearing an image and which has passed through the fusing apparatus 30 is transported to an auxiliary sheet feeding apparatus 32 by way of a transport 34. The feeding apparatus includes a sheet tray 36 which stores the one-sided copy sheets being until such appropriate time as determined by the programmer 31, the apparatus 32 commences transporting the stored sheets by way of a conveyor 37 which again presents the sheets to the xerographic belt 15 for permitting the transfer of developed images thereon to the second side of the sheets. The duplex copies are again transported to the fusing apparatus whereat the second sided images are fixed.

Further details of the processing devices and stations in the printer system are not necessary to understand the principles of the present invention. However, a detailed description of these processing stations and components along with the other structures of the machine printer are disclosed in U.S. Pat. No. 4,054,380 which is commonly assigned with the present invention and which is incorporated by reference herein.

In accordance with the present invention, the electrostatographic duplicating machine 11, 12, 13 exemplifying a variety of high speed duplicating systems with flexible and sophisticated features and options to automatically and conveniently process and manipulate copy sets by varied selective methods or sequences, for the purpose of receiving copies in any of numerous desired quantities, formats, enhancements, and arrangements, is adapted to be converted to copying computer fanfold document material or the like with relatively simple manual activity but with many convenient and automatic control features and much versatility. The resulting apparatus provides the full compliment of processing and manipulating features for copying from continuous web or fanfold document material as is afforded by the duplicating system initially in handling conventional individual documents, and document sets. Furthermore, as hereinafter described, new and unique control features are provided to extend and enhance the flexibility of the apparatus in the arrangement for copying from continuous document material.

Figure 2:
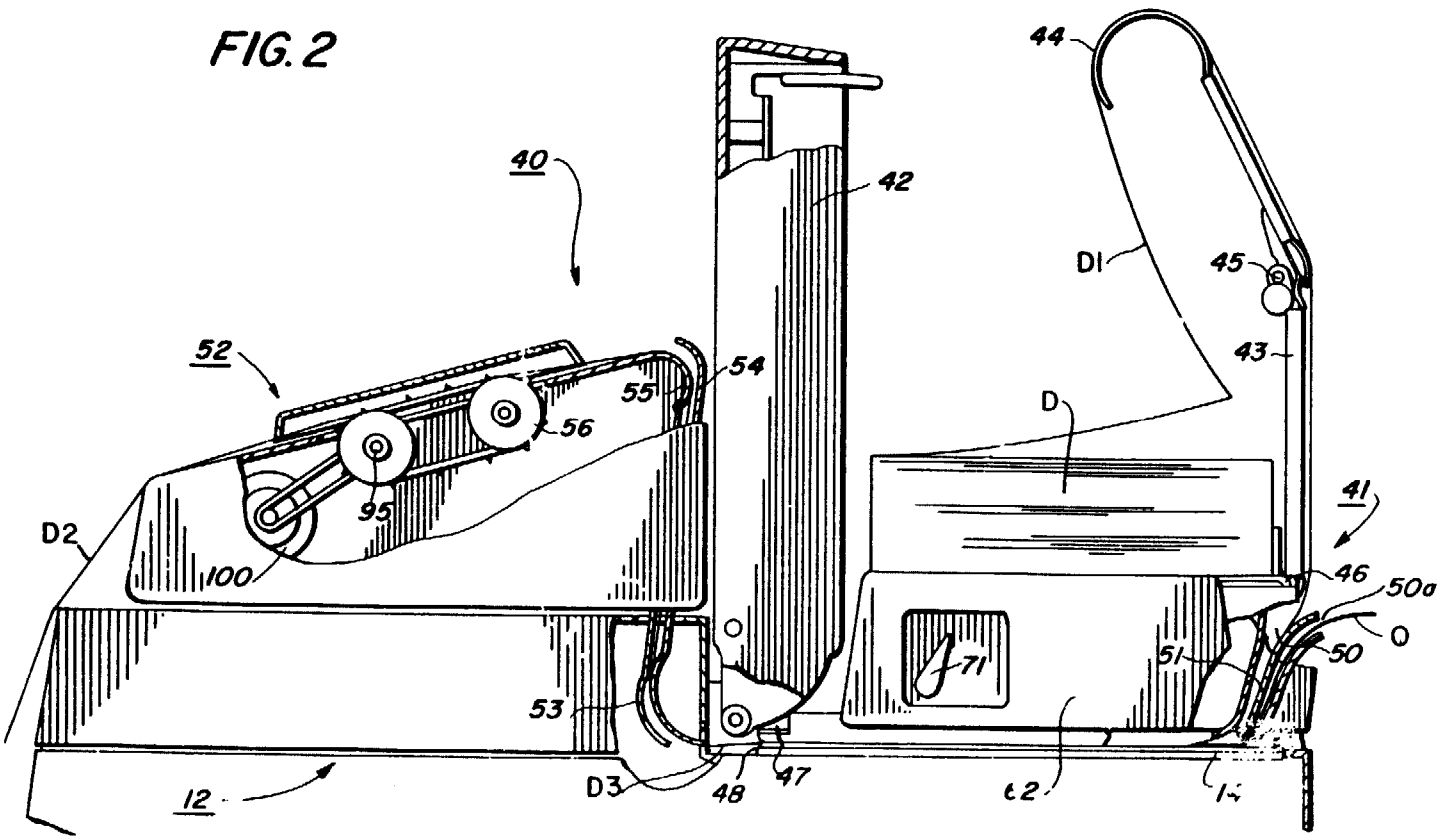
FIG. 2 is an elevational view, partly in section, of the fanfold web material handling apparatus as shown in FIG. 1.

Referring now to FIG. 2, there is shown a computer fanfold document material handling apparatus 40 comprising easily detachable modules adapted to be mounted relative to the conventional automatic document apparatus 12 with a minimum of structural or electrical modifications. The apparatus 40 includes an input continuous fanfold document material device, or platen module, 41 containing a supply of fanfold material D. The platen module 41 rests upon the glass platen 14 when the cover 42 of the document handler 12 is pivoted to a vertical position to allow access to the glass platen, and includes upwardly extending guide member 43 formed with an arcuate deflector member 44 around which the fanfold material D can be positioned from the top of the stack D. The deflector member 44 is pivoted at hinge 45 to the guide member 43 to permit folding together of these elements. The guide member 43 is also pivotally mounted on the module 41 to permit folding of both the deflector 44 and the guide member 43 within the confines of the module interior when the stack of material D has been removed and a support plate 46 for the stack of material has been moved therefrom.

Also arranged in the platen module 41 is a guide channel 50 through which the fanfold material is threaded and guided to condition it in overlying relationship with the platen 14. The guide channel 50 is partitioned at its entrance from a secondary channel 50a by an intermediate guide element 51 which electively allows for the insertion and correct positioning of forms overlay element O adapted for placement between the web material and the platen 14. During copying movement of the web, the overlay element O if electively inserted, remains stationary and the information on the overlay may be added to each frame section when being copied. It will be appreciated that platen 14 is available as a surface on which to position the module 41 when the cover 42 of the automatic document apparatus 12 is pivoted at right angles to the platen. A suitable stop 47 fixed to the machine frame on either side of the platen 14 serves to locate the module 41 relative to a registration edge 48 along which the leading fold edge of each panel of the fanfold material is positioned for copying purposes. It should be noted that the protruding registration edge 48 is automatically displaced below the glass platen surface by appropriate means to afford an open guide channel to the document web material D3 in transition.

With the platen module 41 as heretofore described arranged on the glass platen of a reproduction machine, and configured to support a stack of fanfold material in a vertically spaced position relative to the platen, there is no need for extending beyond the dimensional limits of the host machine exposure system in order to contain and transport a relatively long web material. This compactness and conservation of space is further enhanced by utilizing guides which are able to direct the web material efficiently from a holding station to a plane of utilization and which can be folded into a self-storing compact state totally within the confines of the platen module framework.

Returning attention to FIG. 2, the continuous document material D is advanced in a path across the glass platen 14, then under the glass platen cover 42 into another curved guide channel 53 (which receives the material D as it is threaded and transported from under the cover 42). The document material is directed upwardly by way of a smooth narrow channel within paper chute 54 and then redirected more horizontally over a curved surface 55 on the chute 54 so as to bring the material into conformal engagement with a pair of web material fanfold drive tractors 56 fitted within a tractor module 52. The sprocketed tractors propel the material D in indexing fashion across the surface of the module 52 and onto a steeply sloped exit guide 60 (shown in FIG. 1) and into an input restacking receiving module 61, which also serves to store the three heretofore described modules 41, 52, and 54 when same are removed from the host machine.

As wil be seen hereinafter, the drive means for the material D is adapted for indexing movement so as to index each document frame or panel to proper orientation on the glass platen 14, which occurs when the leading edge of each panel is adjacent the registration edge 48.

Figure 3:
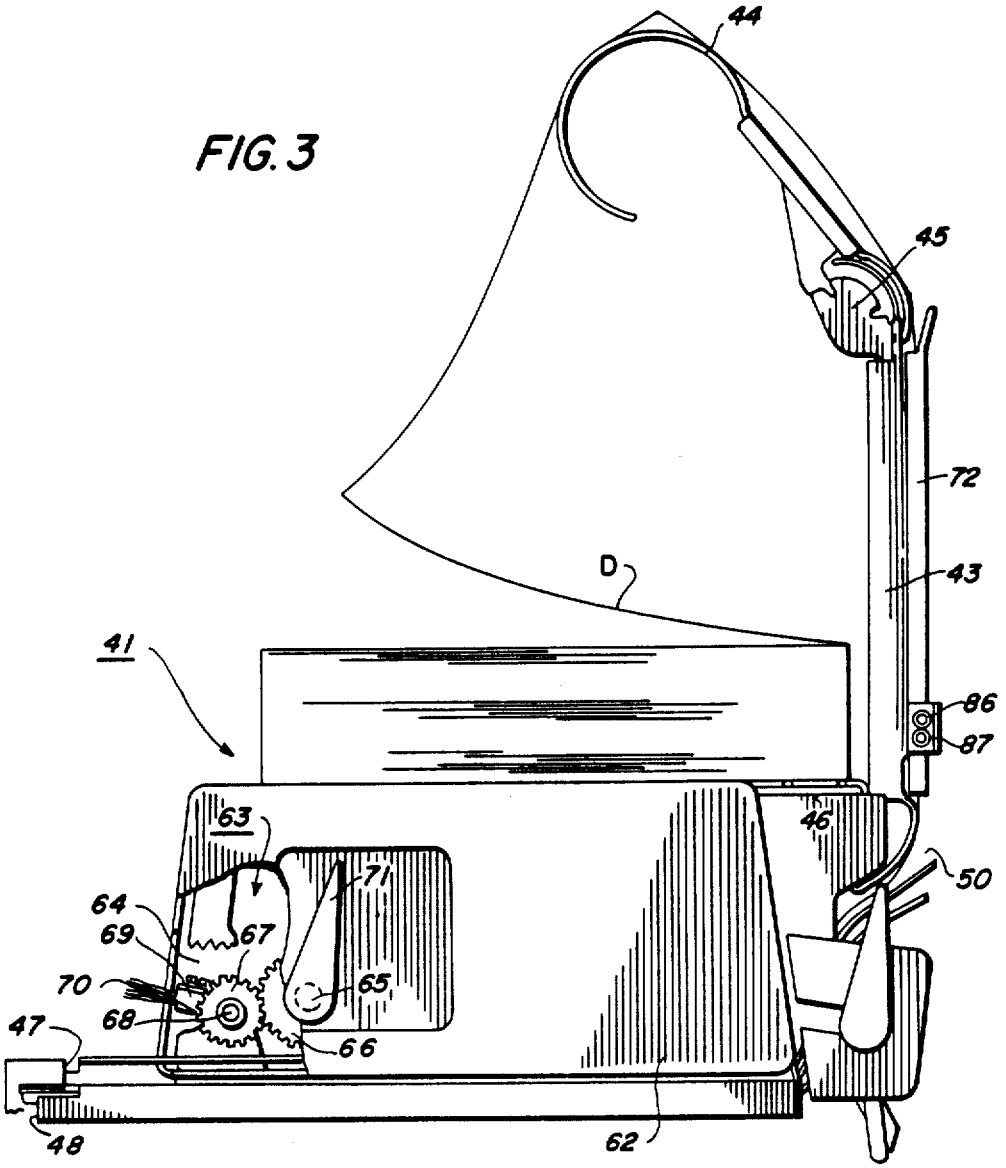
FIG. 3 is an elevational view partly in section of the platen module utilized in the material handling apparatus.

For more details of the platen module 41, attention is directed to FIG. 3 which illustrates a partial cutout of a side wall 62 to expose some of the details within the space thereof. As previously stated, the interior 63 of the module 41 is arranged to contain the deflector 44 and the guide member 43 when folded one upon the other and both together folded within the module.

Framework within the front side wall 62 and other rear side wall 64 of the module supports a shaft 65 therebetween. To one end of the shaft 65 is attached a first gear 66 in cooperation with a second gear 67 mounted on a shaft 68 also supported between the side walls 62, 64. The shaft 68 has a bracket 69 secured thereto approximately midway between the side walls 62, 64 and so arranged as to support a small wire brush 70. The brush is shown in its upper inoperative position, such position provided to impart no resistance to the movement of the document material D for the case that it is manually manipulated through the document path channel, as during initial threading and setup. After the material D has been fully threaded through the fanfold document handling apparatus 40, and for the purpose of preparing the apparatus for normal automatic operation, the brush 70 is rotated downwardly and into contact with the back side of the document material by a handle 71 secured to the shaft 65 exterior to wall 62 of the module 41. The brush 70 in this orientation serves to apply appropriate normal force upon the document material so as to develop a positive and constant tension in the fanfold web material throughout the path from a glass platen 14 to and within the tractor module 52. The web tension so developed serves to maintain a constant and minimized length of web material within the confines of the web channel, between the actual location of document frame registration on the glass platen 14, the lead edge thereof aligned with registration edge 48, and the virtual registration line within the tractor module 52 defined by scribe lines thereupon.

Figure 4:
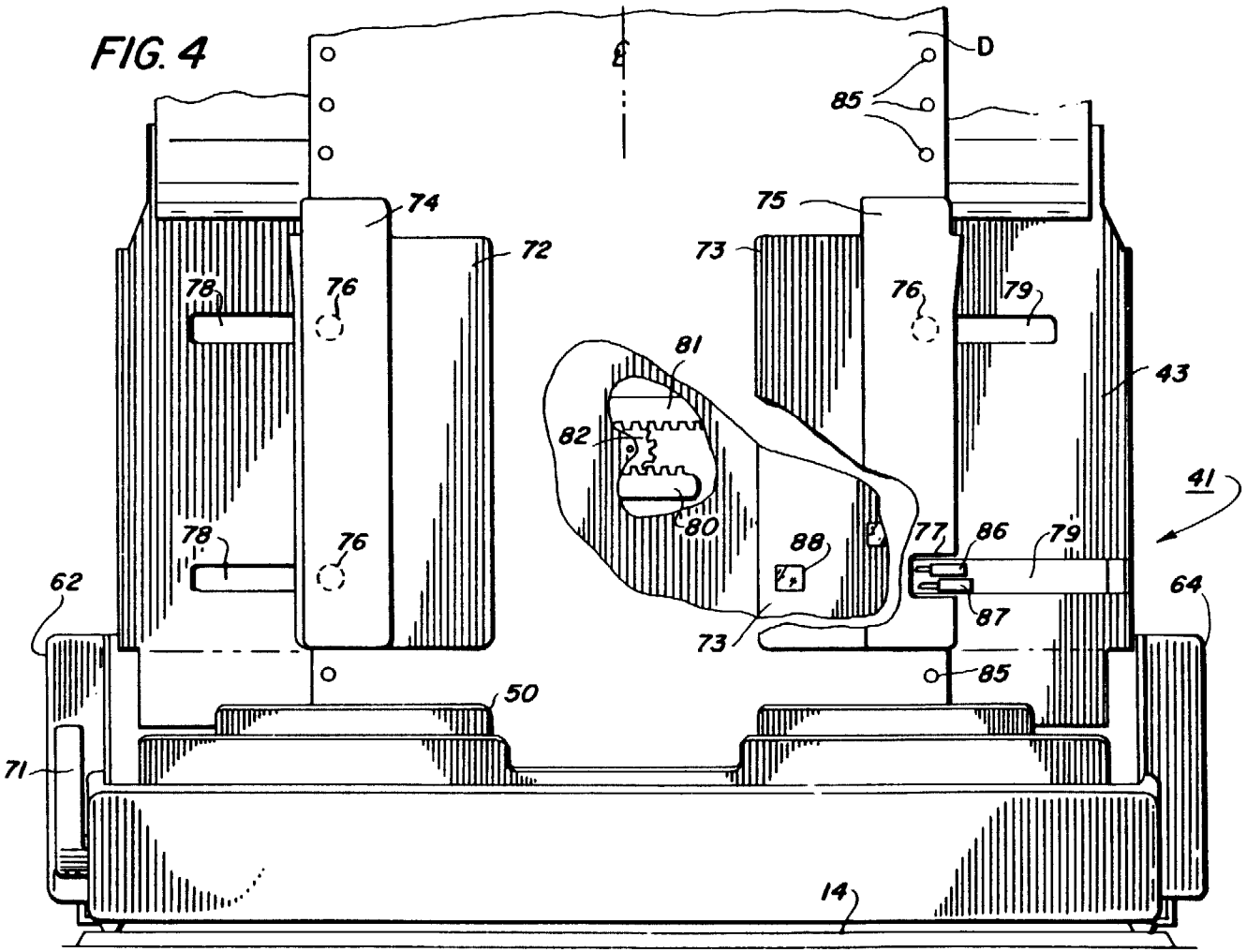
FIG. 4 is a rear elevational view, partly in section, of the platen module showing the document edge sensing arrangement.

Additionally, desirable lateral registration of the document material D within the platen module 41 as shown in FIG. 4, is served by incorporation of edge guiding devices 72, 73 which are adapted along inner surfaces 74 and 75 respectively, to contact and guide the edges of the document material D, as the same is initially threaded through the apparatus 40, and as the same is being transported across the platen 14 in the intervals of operative indexing of the same during copying operation. The guide devices 72, 73 comprise sheet metal plates bent back upon themselves to form closely positioned front and rear guide channel sections within and between which the edges and outermost surfaces of the material pass. Each of the guide channel members 72, 73 is outfitted with pin pairs 77 which are cooperable with slot pairs 78, 79 formed in the vertical guide member 43. The guide devices 72, 73 are laterally movable in unison toward or away from each other in such manner as to maintain respective equidistance from a desired centerline, the same coinciding, for example, with the optical centerline of the host duplicating machine by a suitable rack and pinion mechanism, all of the details of which are not shown. For one skilled in the art it is sufficient to indicate that such a rack and pinion arrangement may comprise a first rack 80 secured to the guide 72 and a second rack 81 secured to the guide 73 and having a pinion 82 mounted for rotation centrally within the member 43 and in cooperable engagement with the racks 80, 81. A suitable handle may be secured to the pinion 82 which when rotated will cause movement of the guides 72, 73 toward or away from each other depending upon the transverse width of the document material D. During operation, the operator will cause movement of the guides 72, 73 to such position as to cause their surfaces 74, 75 to contact the edges of the document material with a relatively light touch.

The platen module also carries sensing devices which may serve various functions with regard to detecting the presence, or inversely, the absence, end, or misalignment of the document material, and further, to detecting motion and velocity of same. These sensing devices applied in conjunction with logic provided to control and operate the fanfold document material handling apparatus 40, afford the continuous determination that: (a) the document material is properly threaded to commence a copying operation or job; (b) same is appropriately handled in precise registration and exact lateral (transverse) alignment in all intervals of operative indexing of same; (c) the trailing edge, or end, of a contiguous length of same has been registered, on the glass platen, and hence a terminating sequence for operatively indexing same, or else, a cycling down activity during a copying operation, or job, is initiated, or both are induced as is appropriate; and (d) in divergence form (b) above, motion of same has been slowed or stopped in the operative indexing interval, in the situation that same might be torn, separated between frames, skewed, wrinkled, or otherwise damaged either prior to or during transition through the apparatus, and as a result operation is immediately terminated and a document handling jam condition is registered.

The sensing devices cooperate with the apertures 85 formed in the fanfold material D along the edge thereof which is transported between the elements of the guide 73. The sensing devices, labeled 86 and 87 in FIG. 4 may be of a suitable transmissive form which includes an LED and photo-transistor to sense the absence or presence of an aperture 85. The sensing of an aperture will produce an electrical signal in the photo-transistor which is suitably adapted to the controlling logic to establish the desirable algorithms previously ascribed to the control of the apparatus 40. The sensing devices 86, 87 serve the same purpose and two are shown laterally displaced rather than one in the event that the document handling material D has indications, perforations, or coding material which may appear as a sensed condition for the sensing devices, or the edge of the material wanders or strays laterally within guide elements 72, 73, and therefore cause the apertures 85 to shift from the path of either one of the sensors. Another sensing device 88 is mounted on the inner panel of the guide 73 and spaced inwardly from the apertured edge of the document material D so as not to be influenced thereby. The device 88 is preferaby of the reflective type aligned in opposition to a specular reflective surface on the outer panel of guide 73 having a light source directed upon the material and a light sensitive element arranged to receive specularly reflected light rays if the material is absent.

Figure 5:
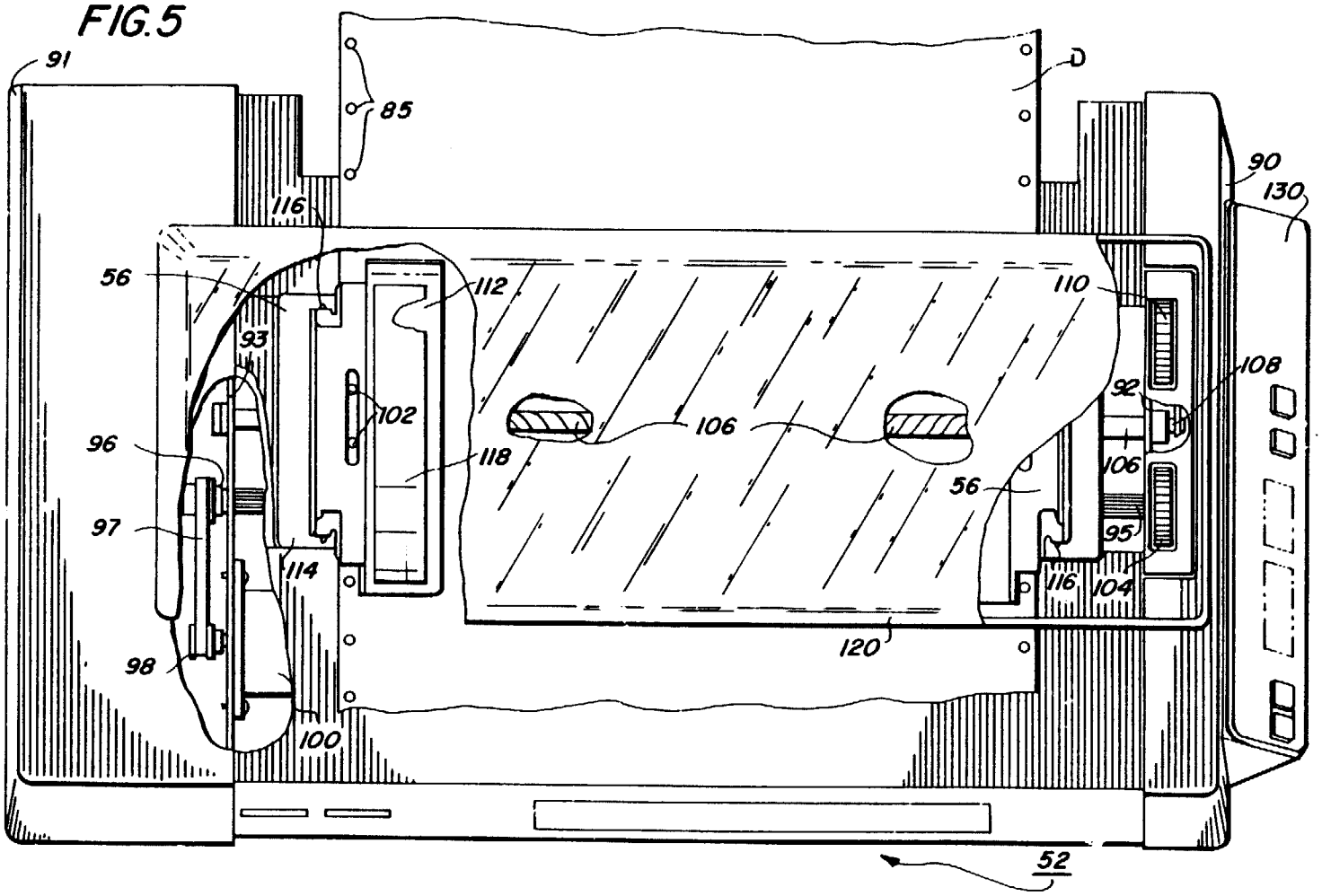
FIG. 5 is an elevational view, partly in section, of the tractor module in the material handling apparatus.

As shown in FIG. 5, the tractor module 52 is provided with exterior walls 90, 91 between which a frame having end walls 92, 93 is arranged. These end walls support a splined drive shaft 95 which supports each of the two tractor drive elements 56 thereon. One end of the shaft 95 extends beyond the end wall 93 and has a pulley 96 secured thereto for cooperation with a drive belt 97, which in turn is operatively connected to a pulley 98 secured to the shaft of a four phase, stepper motor 100. The motor 100 is suitably secured to the end wall 93 totally within the confines of the exterior walls of the tractor module.

Each of the tractors 56 is drivingly engaged with the shaft 95 which upon rotation produces drive movement of the belts 102 on the tractors. As known from use of the conventional tractors, the perforated edges of the fanfold document material D cooperates with sprocket teeth formed on the belts 102 for effecting movement of the web material during activation of the tractors. The shaft 95, as previously stated, is splined so as to permit driving relationship with the tractors regardless of their position upon the shaft 95. At the end of the drive shaft 95 remote from the drive end, and which is journaled in the end wall 92, there is secured a thumb wheel 104 which permits an operator to manually rotate the shaft and thereby the tractors. With this arrangement, the operator may manually thread the material D through the modules and may also register the panels of the material in proper position for indexing in accordance with registration marks inscribed upon the tractor top surfaces.

Figure 6:
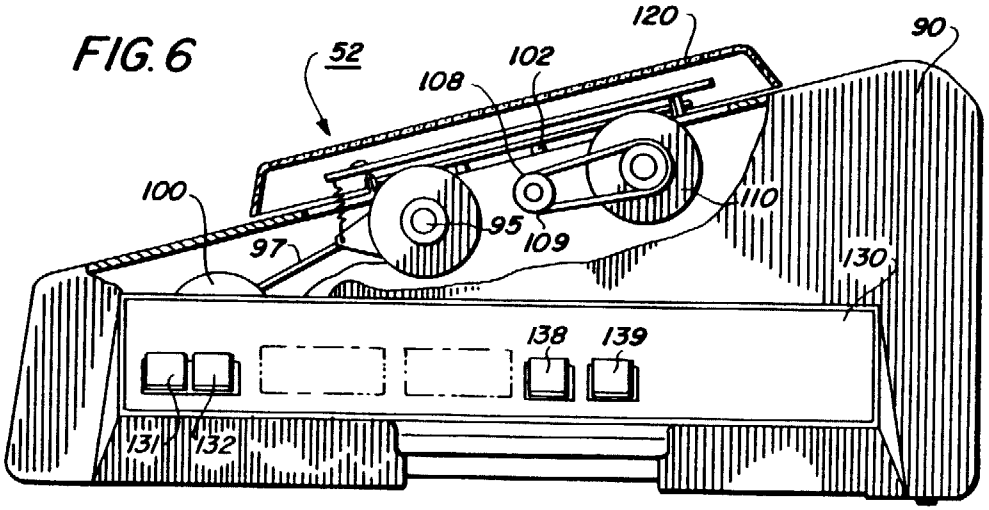
FIG. 6 is a plan view, partly in section, of the tractor module.

In the tractor module there are means provided for adjusting each of the tractors 56 toward or away from each other relative to a center line of the module in order to accommodate computer fanfold material of different widths. As shown in FIG. 6, the end plates 92, 93 also support a double equally pitched but oppositely threaded helical shaft 106 having its ends journaled in the plates. The end of the shaft 106 adjacent the thumb wheel 104 has secured thereon a pulley 108 connected by a belt 109 to a thumb wheel 110, suitably rotatably mounted on the end wall 92. By turning the thumb wheel 110 in either direction, an operator effects rotation of the double helical shaft 106 and consequently the inward and outwardly movement of the tractors 56. Each of the tractors is provided with guide plates 112 which are pivotally mounted relative to the base 114 of the tractor by means of a thin pivot rod 116 extending through the same. The guide plates 112 may be pivoted upwardly to expose the tractor belts 102 thus permitting the insertion of the teeth on these belts into the perforations of the computer fanfold material D.

There is also engraved on each of the guide plates 112 indicia 118 which the operator utilizes to position the leading edge of a frame of the fanfold computer material and which is calibrated in accordance with the vertical length dimension of the frame. If the operator utilizes a leader attached to or formed as a part of the computer fanfold material which is threaded through the entire apparatus as previously described, the leading edge of the leader may be positioned relative to the appropriate indicia 118 indicative of the size of the frames for the material to be copied. When so aligned, the dimensions of the guide elements previously described relative to the platen module and the tractor module are so dimensioned that the leading edge of a frame will be registered with the registration edge 48 of the platen module. Subsequent indexing of the computer fanfold material by the tractor module will for each indexed motion align the next succeeding lead edge of the next succeeding panel of the material D. The motor 100 is adapted to index the material D in half-inch steps on each pulse command since, the standard fanfold material is provided with sprocket openings 85 which are one-half inches between centers. The indicia 18 will permit the operator to select any fanfold frame length from 5.0 to 12.5 inches in half-inch increments. A dust cover 120 made of suitable transparent plastic is arranged to be removably positioned upon the structural elements of the tractor module and the drive elements therefor.

In FIG. 7, there is disclosed a functional block diagram for the various operative control elements in the above-described computer fanfold material duplicating system. Referring to FIGS. 1 and 7, the control panel 31 for the reproduction system 11, 12 and 13 is functionally related to the fanfold material handling device 40 which includes a control panel 130 associated with the tractor module 52. The control panel 31 is provided with various push buttons which can be utilized by the operator to program the host xerographic processor for its many functions of operation. Since not all the functions of the processor for the machine 11, 12, 13 are directly related to the control of and operative features for the apparatus 40, and whereas further description is disclosed in U.S. Pat. No. 4,054,380, heretofore commonly assigned, and hereby incorporated by reference only those control points which are essential to understand the salient features provided for the apparatus 40 will be described herein. The control panel 31 is the control panel for the Xerox commercial machine labeled 9400, and the processor 11 is the processor for this commercial machine, and references to functions within these are exemplary to assist understanding of the apparatus 40, and in no way restrict the general application of its unique features.

The operative controls associated with the panel 130 are as follows: an Advance form feed push button 131 and a Reverse form feed push button 132; three Feed Quantity selection lever wheels 133, 134 and 135; 0 to 9 indicating windows 133a, 134a and 135a associated with each of the lever wheels respectively; Form Length pre-selection lever wheels 136, 137; 0 to 9 indicating window 136a, and 0.0 and 0.5 (fractional) indicating window 137a associated with each of the lever wheels 136, 137 respectively; an Auto Feed push button 138; and a Single Feed push button 139.

The Advance button 131, as indicated by the small left-pointing arrow below the button, is adapted to energize the stepper motor 100 for advancing the fanfold web D through the tractor module 52, while in the Preparation or Job Recovery modes, which will be well defined later. The advance action is cooperable with the Form Length selector 136, 137 and with the Feed Quantity selector 133, 134, 135 by way of the control logic features as will be elaborated hereinafter. The provision of this feature permits the operator to skip large sections of the material D in a short period of time, when, for example, panels to be copied are spaced at great distances in a large size web, or desired panels are buried within the web. The Reverse button 132, as indicated by the right-pointing arrow bellow this push button, initiates the reverse movement of the fanfold web, and is cooperable with Form Length selector 136, 137. However, in this operation, the web D is moved one frame or panel of the material D per button press. This control feature is primarily used in the Job Recovery mode.

The Feed Quantity selector lever wheels 133, 134 and 135 permits the selection by the operator of the numbers of computer fanfold panels or frames desired to be either advanced, in cooperation with Advance 131, as for example, for positioning the initially desired frame into registration in preparation to produce copies thereof, or else copied, in cooperation with suitable selection of features on the control panel 31, and notably, Start Print 142, during a reproduction run or job. The wheel 133 controls the hundreds, the wheel 134 the tens, and the wheel 135 the units of a number to be placed in the feed quantity windows 133a, 134a, 135a, respectively, and hence, collectively provide a three-digit (decade) Feed Quantity selection entry and display system. As shown in the drawing, the numeral 025 is shown to indicate a typical number the operator has selected for the number of panels to be advanced or copies. Detailed description of the lever wheels is not necessary since these items are available commercially. All that needs to be said in regard to these wheels is that sequential actuation vertically from the "up" to the "down" positions will advance a rotatable counter wheel or indicator from 0 to 9 to indicate a count at the associated window. These lever wheels preset the feed quantity number in an alterable memory device in a programmer associated with the control panel 130.

The Form Length selector lever wheels 136, 137 together establish the length of a form or web panel or frame to be advanced on each controlling logic command. In the preferred embodiment, selectable lengths range anywhere between 5.0 and 12.5 inches inclusive, in half-inch increments, which provides adequate adaptability to the majority of commercially available and typical frame sizes for the fanfold computer material. While the lengths have been designated in whole and fractional inches, it will be understood that other lengths of different extent, range or resolution may be utilized, or lengths may be designated in the metric measuring system. Preferably, the wheel 137 cooperatively with display element 137a sets in the half-inch size of a fanfold panel and the wheel 136 cooperatively with display element 136a sets in the full inch lengths. As shown in the drawing, the numeral 08.5 is shown to indicate that a panel of size 8½ inches will be advanced for each controlling logic command.

The Auto Feed push button 138 permits the operator to select the Automatic Feed mode of operation for application in conjunction with the processor 11, wherein the fanfold material D advances one panel length automatically upon completion of the copy quantity sequence, as selected and determined on the processor control panel 31, and copying is continued. For example, if the number "5" is preset by the keyboard push buttons 140 on the panel 31, and Start Print button 142 thereon is depressed momentarily, the processor 11 will produce five copies of a document on the platen 14, which in this case is a panel or frame of the web material D. The web material will now be automatically advanced one panel length by the apparatus 40 and its associative controller 150, and additionally a command signal that is equivalent to Start Print is delivered from controller 150 to the host processor controller 31a, cooperatively linked to program panel 31, which causes the processor 11 to produce five additional copies, which are reproductions of the just registered new panel. This cyclic activity may be repeated indefinitely, with host processor control and operative slave to the controller 150 within the guest apparatus 40. However, the operating cycle can be terminated by several automatic or manually initiated events, as will be described hereinafter. The total activity just described, comprising a multiplicity of copies of a multiplicity of original documents (frames or panels of material D herein) is generally known collectively as constituting a "Job".

If the Single Feed push button 139 is actuated, a Single Feed mode is established wherein material D is automatically advanced one panel length upon completion of a specified copy quantity, whereupon copying activity is halted for the lack of a Start Print command signal emanating from the controller 150. However, in this situation, pertinent copy-run, or Job, status information is maintained in memory elements within each controller, 150 and 31a, as is appropriate for the eventual continuance of said Job as a unified whole, which will have, until its completion, the advantage and power of automatic verification of page and sequence integrity that is within the capability of the cooperating controllers 150 and 31a. Hence, this described mode effects a predictably occurring Job Pause feature, which may be willfully implemented by the operator at any time such may be advantageous, either initially, prior to, or else during, any reproduction run or Job. In any such case, the Job may be continued by depressing the Start Print button 142, or else terminated, if so desired, by depressing the Stop Print button 143.

As shown by general block diagram format in FIG. 7, control settings made by the operator by means of control panel 130 serves as a program input to a controller 150 which also is adapted to receive input from the control panel 31 and its concomitant controller 31a for the processor 11. The later inputs may comprise input by way of a start Run signal from the Start Print button 142, as previously stated, a stop Run signal from a Stop Print button 143, a Duplex mode input associated with the two-sided copy button 144, and a Job Recovery status signal related to the Job Recovery button 145. A digital display 146 on the panel 130 serves to indicate the number, or count, of the forms panel being copied at any time and counts up panels or frames initially from "1" as the material D is forwardly indexed during a Run mode. The significance and value of this Document Number display will be more fully realized with additional descriptions to be presented henceforth. Additional power is derived for the controller 150 and panel 130 from a low voltage power supply 151 which, resident in processor 11, is connected to 115 volts ac power line 152 therein. The low voltage supply 151 supplies the controller 150 and control panel 130 with various voltages as is necessary for the logic control circuits and elements, and for the various operative processing devices. Suitable voltages may include +24 volts dc, +20 volts dc, +12 volts dc, and 14 volts ac typical for such use.

Various interlock switches are associated with the controller 150 such as a switch 153 which may mounted in the platen module and be indicative that the brush 70 is in the "Up" position. Another interlock switch 154 may be mounted in the tractor module 52 to be actuated to an open condition in the event this module or some element thereof is not in correct position. In the event that either the switches 153, 154 is in the open position, the reproduction system cannot be initiated to an operative mode. Suitable panel display lights may be provided to indicate that the switches are open and thus inform the operator that the respective condition must be corrected.

Also serving as an interlock function is the monitoring of voltage across diodes 86a, 87a, and 88a which are of light-emitting nature, and hence also afford illumination to the light sensitive phototransistors 86, 87, and 88, respectively, which have been previously described herein. With regard to the final form sensor 88, in the event that the fanfold material has become broken or the last panel of the material D has moved across the sensor, an automatic Last form tracking logic circuit is enabled within the controller 150 which eventually will cause the processor to cycle down from Run mode, depending upon the predetermined number of remaining material panels between the sensor and the panel registration edge 48 on the platen 14, but only after the final copy of the last panel has been accomplished. This arrangement offers one means for automatically terminating a Job in either Automatic Feed or Single Feed Run modes previously described. The "Last-form tracking" logic is automatically programmed by decoded binary information derived from the Form Length selection.

Outputs of the controller 150, as presented in FIG. 7, include such various status and command signals as are essential or expedient in maintaining full communication with the host controller 31a and additionally with various control devices within the host processor as may be pertinent. These will be more fully explained later, but may include such outputs as Start Print or Stop Print command signals, Duplex and interlock control signals and the like. Furthermore, the controller 150 may also operate such job accounting devices as may be desirable, such as counter elements 177, 178. However, the most fundamental operative function of the controller 150 is the full control of the stepper motor 100, by way of power supply 174, which is the prime mover for material D through the apparatus 40.

The Stepper motor 100 is adapted to be energized in a way therein during the single actuation of the Advance switch 131, or when the system is in either Auto or Single feed modes, and an appropriate command signal is developed variously within logic 150, the velocity of the motor will increase from zero to medium speed (M.S.) which has been set to approximately equal the processing speed of the processor 11. It is to be pointed out that the medium speed (M.S.) for the movement of the web material D, described herein, may be approximately equal to the processing speed of the xerographic processor 11. This does not mean that this relationship is the same for the production rate of the system, 11, 12, 13. Since there is a slight loss in time for each cycle of web movement, that is, for flash illumination of a frame on the platen 14 and then movement of this frame so as to present the succeeding frame on the platen, the rate of production of copies of the web is slower than the full uninterrupted production capability of the system. For example, if the production rate of the system is 120 copies per minute and the processing speed is 20 inches per second, then with the web movement being approximately equal to the processing speed of 20 inches per second, the production rate of the frames of the web will be less than 120 copies per minute. In actual practice, for a singe copy of each frame, this rate has been approximately one half of the system production rate or about 60 copies per minute.

At high speed, (H.S.) of movement of the web for each cycle of web movement, the production rate for the reproduction of the web may be doubled, or to equal the full capability of production of the system. If the Advance switch is continuously actuated as in the Slew mode, the speed of the motor increases still higher to high speed (H.S.) which may be approximately twice the speed of medium speed. In either situation, in arriving at high speed or medium speed, or in descending to zero speed, the build up is gradual as is the descent, that is, there is a soft start and a soft stop. This gradual acceleration/deceleration is specifically devised in circuitry and in the motor itself in order to minimize wear on the motor and its associated drive train as well as upon the web material D itself. This circuitry, which will be described below, is specifically devised to be coordinated with processing speed of the processor 11 to thereby maintain continuously maximum throughput for the system.

Another advantage of the stepper motor type of motive force is that it provides a holding torque force, at zero velocity, whereat the motor and thereby web D become essentially locked into position at the intervals of static registration unable to be diverted therefrom by externally developed forces, such as may be applied by friction or static attraction along the web path, or unpredictably by the operator, thereby placing a constant controlling tension upon the web D. The result is that exact and precise control and registration of all frames or panels of a web material D can be guaranteed in the apparatus 40 of the present invention throughout the generation of a Job, wherein the web material D is repeatedly and successively indexed and registered, notwithstanding the extent of length of web D, nor the expanse of time said web D may be in motion, as while indexing same, or in stagnancy, as whenever same might be placed in a position of registration, or else in some combinational sequence of both conditional states.

The controls block diagrams of FIGS. 8a–8d show the controller 150 in more functional detail. In order to clarify terminology and nomenclature utilized herein, and in particular, in the description below, the fanfold material D will take various terms depending upon specific use. Variously, the material D may be termed as panels, frames, fanfold material, and forms.

The controller includes a logic block 160 devised for conditioning inputs from the control panel 130 in conjunction with several preconditioned inputs from various other logic blocks, in order to establish fundamental modes of operation for the apparatus 40, and to display same as appropriate by way of outputs to indicators on panel 130. From the control panel 130, the logic 160 will receive as input signals resulting from actuation of the "Auto" or "Single" feed switches 138, 139 and actuation of the "Advance" or "Reverse" switches 131, 132. Input to the logic circuitry 160 also includes indications of closings of the tractor module cover switch 154 and the platen module brush "down" switch 153 from the platen module 52 by way of intermediate block 160a. The circuit 160 will also receive input from Jam Sense logic 160b to the condition, or state of the fanfold material motion sensor pair 86, 87, and the final frame sensor 88. As previously stated, the sensors 86, 87, 88 will variously sense forms jamming conditions in the apparatus 40, a break in the material, or the final frame occurrence, the latter effecting a final frame coincidence condition signal from Final Frame Tracking logic 161.

The final frame coincidence condition from logic 161 will also be sent to a Systems State and Transition Logic circuit 162 to which another signal known as feed quantity coincidence from a Feed Quantity Program Counter 163 is directed. With the Counter 163 being programmed for a specific number of fanfold frames to be copied by means of the console switches 133, 134 and 135, and the apparatus 40 being apertured, for example, in the Automatic Feed mode during a reproduction Job, as heretofore described, the normally applied automatic means for terminating the copying operation, and hence completing the Job, is upon completing copies of the number of frames programmed in Counter 163, whereupon the system cycles down, displaying a Job Complete indication. However, if the Feed Quantity Counter 163 is left unprogrammed, as by leaving switches 133, 134, and 135 at their "000" positions, respectively, or otherwise is programmed to a number that exceeds the actual number of panels, or frames, in the web D, automatic Job termination is accomplished by way of the Final frame coincidence signal from logic 161, as previously described, and two displays are presented, namely, Job Complete and Check Forms Path. The latter indication is displayed in the event that Job termination is in fact premature, as due to a break in the web material D, whereupon the operator may recover according to normal jam recovery procedures.

As previously stated, the control panel 130 for the fanfold material handling apparatus 40 cooperates with the panel 31 for the host processor 11 so that the total system is adapted to produce copies as programmed in the panel 130. The various control functions of the panel 31 serve to condition the processor 11 for its specific functions as part and parcel to a production run. As shown in FIG. 8a, only several essential control functions of the host processor 11 are brought into the integrated control 150 system by way of the Interface Signal Conditioning circuitry 165. Such inputted signals may take the form of a "Ready" signal to indicate that all of the necessary processing stations in the processor 11 are in the "Ready" condition. Another input would be the actuation of the "Print" button 142 as previously stated. Still another signal would be in the form of an indication that there is a production run still in progress, that is, a job in being (JIB). Another input signal to the Signal Conditioning circuitry 165 would be indications that a fanfold material frame has been illuminated for the translation of image therefrom to reproduction process, such as, for instance, by the flash lamps illumination device associated in the apparatus 12. A flash count coincidence signal may also be impressed upon the circuitry 167 when all of the flash signals, in a copy sequence, as programmed on panel 31 by way of buttons 140 defining the number of copies per frame, have been produced. When the circuitry 165 detects that processor 11 is in condition for running, a status signal A Print is transmitted to the Transition logic 162 which may convey to the Sequencing logic 164 that: (1) the job is still in progress, (2) that it is time to index to the next frame during the run cycle, (3) an early indication of the eminent end of the run, (4) the reproduction run is complete, and (5) any other suitable indication necessary for system operation.

Output of a Forms Length Counter 166 and the input signal conditioning logic 165 is impressed upon a Servo Move Cycle Processor 167 which in turn has its output conveyed to a Velocity Contour circuit 168 and thence to a Voltage Controlled Oscillator 169. The output of the Oscillator 169 in the preferred embodiment of the invention is directed to a Divider Matrix 170 which divides a signal therefrom by 8 and also to another Divider Matrix 171 which divides the signal by 32 in four signals of quadrature phases, each with a 15/32 duty cycle. The divider 170 produces a step clock to serve as an input to the forms Length Counter 166. The Forms Length Counter 166 is also seen to receive encoded form length program signals from the selectors 136, 137 of same notation. This program is stored in a memory whenever a forms indexing operation is initiated, as will be elaborated later, whereupon it is referenced for comparison with the counting of the step clock, the latter so devised as to precisely represent each incremental stepping action of the Stepper Motor 100, which in turn is conjunctively coupled to the forms D by mechanisms within Tractor Module 52, as heretofore discussed. As previously stated, the lengths of the frames of the fanfold material may be selected from 5.0 inches to 12.5 inches in half-inch increments. This results in a choice of 16 discrete lengths that encompass the commonly known lengths of commercial fanfold material for use in the apparatus.

The divider 171 is also adapted to divide the output of the oscillator 169 by 8; however, since there is a four phase output which is desired to be of 15/16 duty cycle to educe from the Stepper Motor 100 superior performance characteristics, as demanded in the application at the present invention, and particularly, at the highest slewing speeds attained during indexing operations, total effective division by 32 is provided, which is later recombined into the four phase output as described, within the divider block 171. The output for the divider 171 is conveyed to a Hold Run and Direction Gating logic 172 by way of four conductors indicated by the lettering W, X, Y/Z and Z/Y, each representing one of the noted four outputs which are phase-related in quadrature fashion to one another. The logic 172 controls each of the phases by way of suitable circuitry to a driver circuit 173 and then to high current output transistor switch elements within the power supply 174 for the Stepper Moter 100.

Figure 8B:
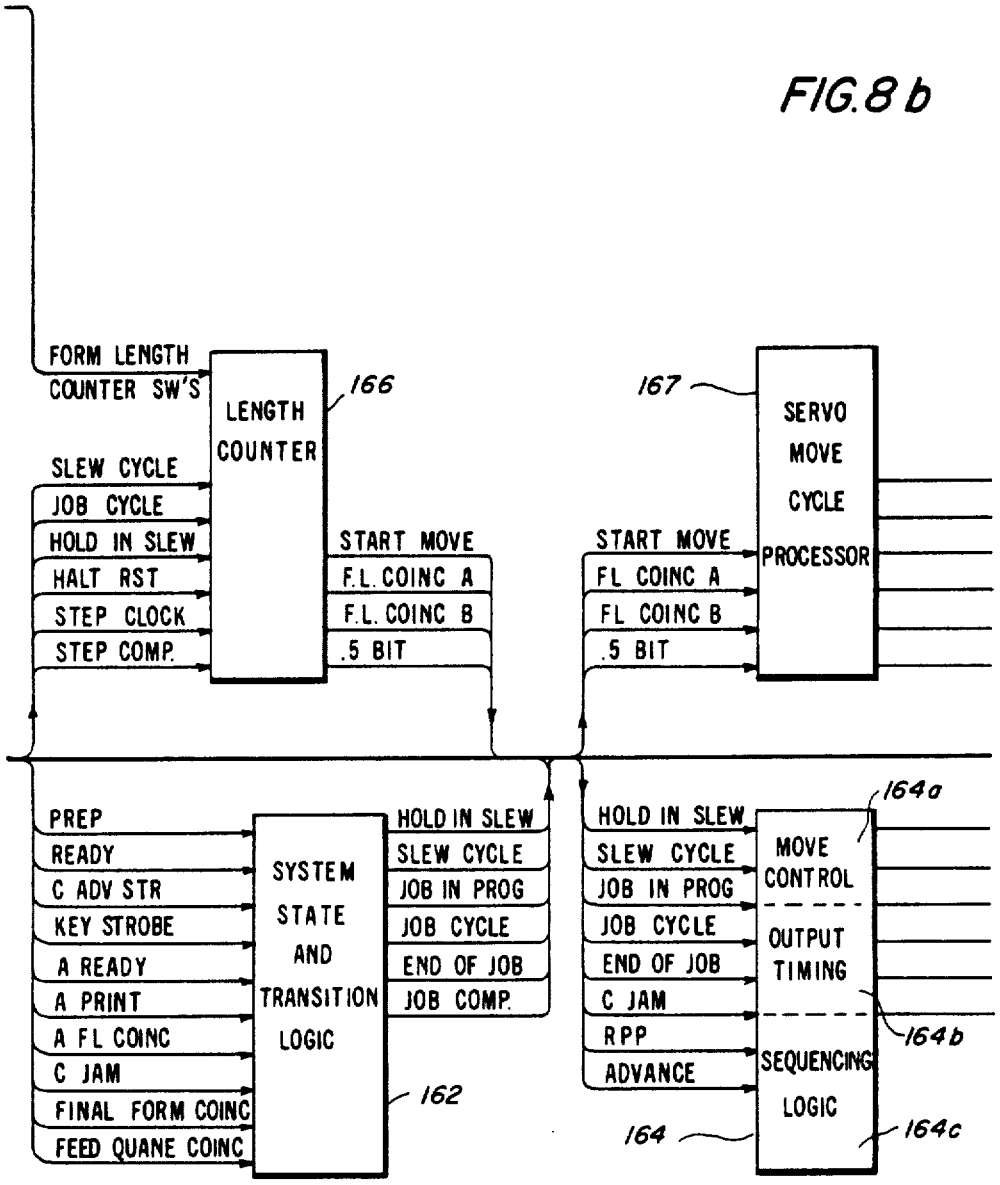
Figure 8C:
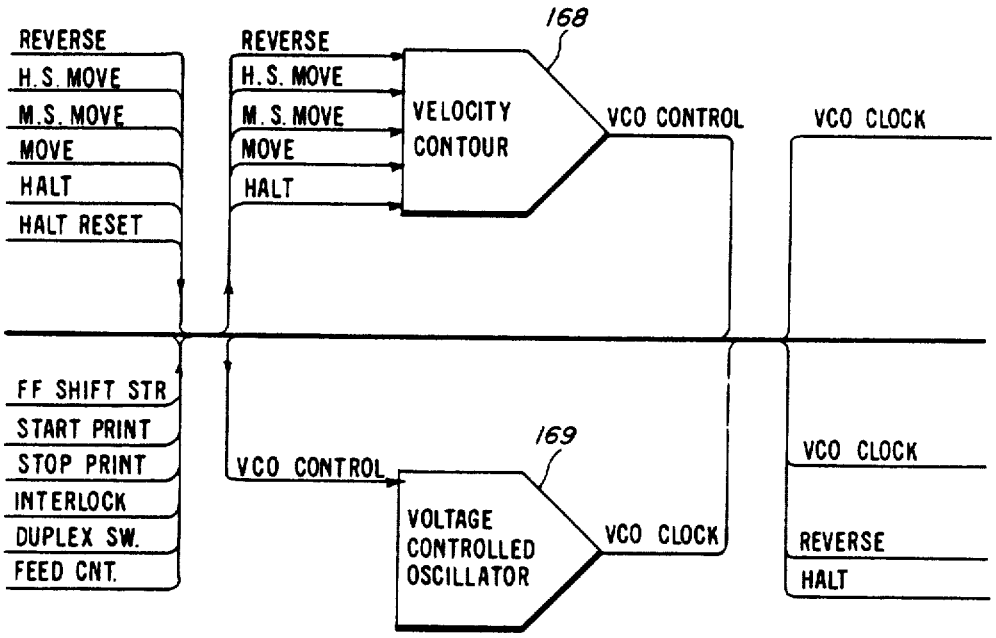
Figure 8D:
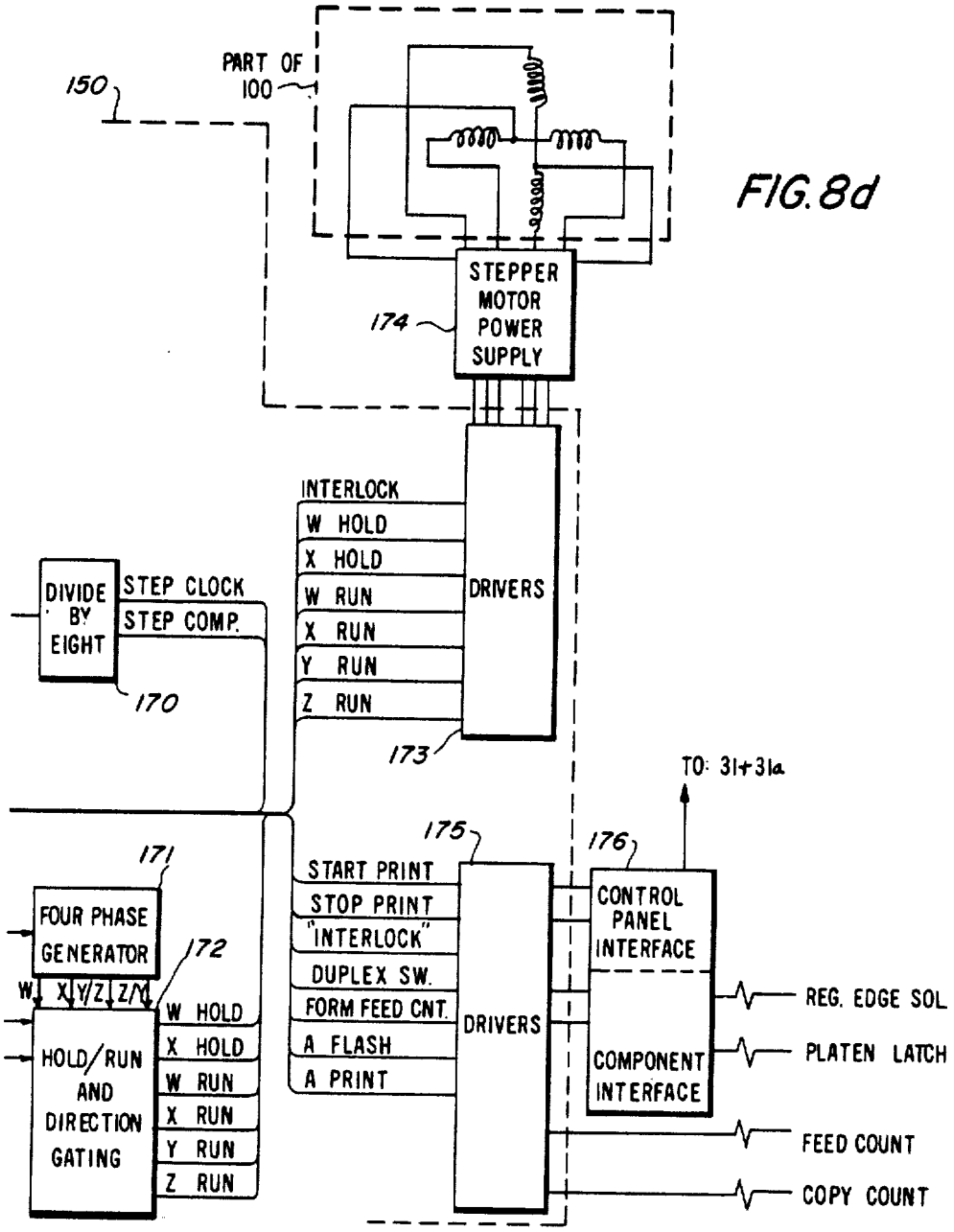

In FIG. 8d, output signals emanating from the sequencing logic 164c are shown directed to a driver circuit group 175. The driving amplifiers in this section perform gain and buffering of various output commands produced from within controller 150, prior to their being dispatched to their respective pertinent output elements and devices. For example, as elsewhere ascribed herein, some of these outputs are directed into several elements of the host processing system, 11, 12, 13, including: component portions of the control panel 31 and associated controller 31a; a Registration Edge solenoid within apparatus 12 linked in such manner as to manipulate a Registration Edge alignment mechanism located therewithin at 48; and a latch solenoid within system 11 attached to mechanisms appropriately arranged to engage a latch hook within cover 42, or else a similar one within Platen Module 41, so that either one unit or the other can be permanently locked into position upon the glass platen 14, when so desired. Elaborating for further information, signals directed back at the controller 31 and 31a may include Start Print, Stop Print, Duplex switching, Interlock validation, or the like, for the purpose of conditioning and sequencing the overall system, inclusive of host (processor 11, 12, 13) and guest (apparatus 40). All of these output signals and commands just described are additionally processed, isolated, buffered and amplified as applicable in an Interface circuit block 176, the details of which are not significant to the present invention. In addition, other outputs of the controller 150, are presented through drivers in 175 to valuable elements within the apparatus 40, such as, for example, electromechanical counting devices 177 and 178, which may count and totalize numbers of form frames indexed by Feed Count or copies generated, by Copy Count, with the overall system, or the like.

Various status information developed by the control logic 150 of the present invention also must be presented on the control panel 130 by illuminated displays. As shown in FIGS. 8a–8d, the I/O Conditioning logic 160 includes display lamp outputs of ten 14 VAC return line conductors to the control panel 130. Each of these outputs comprise a triac switch in the respective 14 VAC return conductors that may be connected to various indicators (not shown) on the control panel 130 as being indicative that the respective output is operative. For example, some of these displays indicate such various system conditions as Ready, Interlocks Open, Forms Path Jam, Job Recovery, or the like.

FIGS. 9a–9h are a more detailed diagram of the control logic 150, shown in the block diagrams of FIGS. 8a–8d. The test which follows will likewise describe operating features of the logic 150 in much more thorough detail, so that a better appreciation may be gained for its conjunctive utility with the apparatus 40 and host system, such as processor 11, 12, 13, or the like. With regard to logic levels, it is noted that a logic "1" approximates 12 VDC and a logic "0" approximates 0 VDC. For discussions herein, the following hold true.

a. High = "1" = 12 VDC b. Low = "0" = 0 VDC

With regard to the logic block 160 there are four switch inputs as indicated above. The inputs for these switches pass through identical RC filter networks as well as Schmitt trigger circuits which debounce the switch outputs and condition them for use by integrated circuits. The output from each Schmitt trigger attains a high or low level depending on switch actuation and for the switches: Advance 131, Reverse 132, Auto Feed 138, Single Feed 139, the respective Schmitt trigger outputs a low level at each switch actuation, or a high otherwise.

Figure 11:
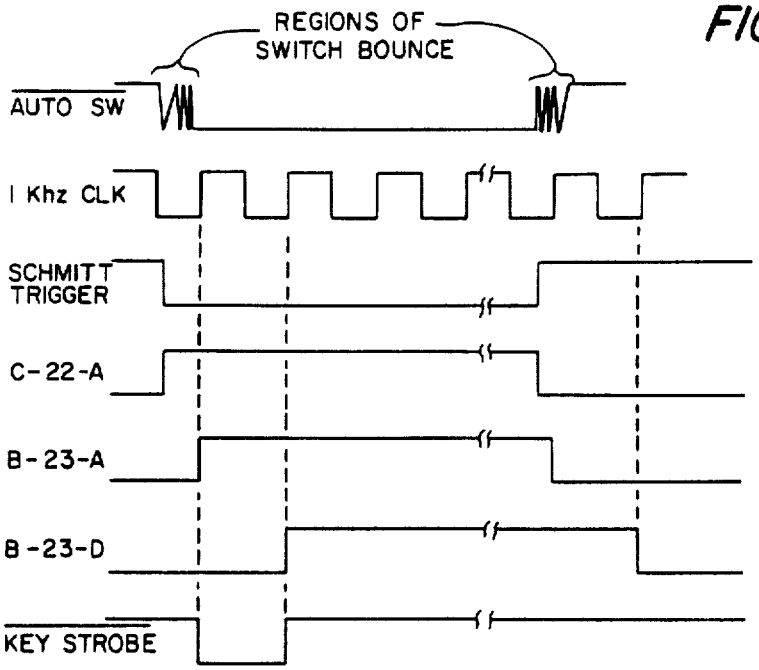

The logic block 160 shows the outputs of the four Schmitt circuits connected to a 4-input NOR gate C22A, which in turn, feeds a strobe generator consisting of two D-type flip flops B23A, B23B, and NAND gate D23A. The strobe generator develops a pulse called Not Keystrobe at D23A's output whenever a switch actuation occurs. FIG. 11 illustrates a typical timing sequence for this circuit during an Auto Feed switch 138 actuation. From FIG. 9a it can be seen that actuation of the Auto Feed switch 138 causes the probe generator to produce a single pulse synchronized to the one KHz system clock, that ultimately sets the Auto flip flop D16A conditional only on the logic levels indicative of Not (No Forms) and Not (Reverse).

Assuming that the sensors 86, 87, and 88 detect the presence of the fanfold material D, a No Forms signal at inverter D29A remains low. Since the Not Keystrobe pulse from gate D23 drives NOR gates D17A, D17B, and D17C and only gate D17A meets the proper conditions, and with the Auto feed switch 138 actuated, and the Reverse switch 132 not actuated, the Not Keystrobe pulse is inverted and sets Auto flip flip D16A which, along with D16B, was originally reset at power-up by the Initialize pulse, high because the J input of D16A resets at a high level during the low-high transition of the Not Keystrobe. When D16A goes high, it turns triac T2 on via gate E4B and transistor Q2 whereupon triac T2 couples a 14 VAC to a suitable Auto feed lamp mounted on control panel 130 and the lamp illuminates indicating the Auto Feed mode of operation. The Auto Feed mode signal also propagates through the controller system 150 as required.

If, during the Keystrobe clock transition, the J input of D16A is low, then nothing happens and the Auto feed mode is not in operation. The pulse Keystrobe at D17A passes through inverter D29B and through NOR gate D22A which resets the Single Feed mode flip flop D16B. Therefore an idle mode, known as the Preparation mode is maintained at gate D18A, and the Prep lamp remains lit. When Single feed switch 139 actuation occurs, the same sequence of events takes place. Now, however, the Not Keystrobe pulse passes through NOR gate D17B and sets flip flop D16B high, provided No Forms at inverter D29A input stays low during the low-to-high transition of Keystrobe. A high D16B output turns triac T3 on and ultimately illuminates a suitable Single feed lamp on control panel 130. At the same time, the Keystrobe pulse after passing through inverter D29C resets Auto flip flop D16A. As with the Auto feed mode of operation, a lack of the fanfold material D results in a high level at D29A input which causes D16B to remain reset and the Single feed lamp to remain off, while the Prep mode lamp remains lit.

When neither the Auto feed switch 138, or Single feed switch 139 have been actuated and power has been applied, then by default, the present arrangement reverts to the Prep mode. The Prep mode of operation occurs during Initialization and whenever both flip flops D16A and D16B maintain a reset state. Gate D18A notes these states and enables triac T1 to an on state and illuminates a suitable Prep lamp to indicate that the apparatus 40 is in a preparatory standby condition.

When the Advance switch actuation takes place, the pulse generaator B23A, B23B, D23 once again generates a Not Keystrobe pulse and applies it to NOR gate D17C. With the other two inputs to this gate, (Advance) and (Prep + Recover Page) both low at this time they allow Not Keystrobe to pass through and become C Advance Strobe. This strobe is used in the System State and Transition logic block 162 to generate a Slew in Progress (SIP) logic condition that proceeds through inverter D12A, turns triac T4 to the on state and turns on a suitable Advance lamp. Actuation of the Reverse switch follows a similar pattern as with the Advance, with generation of a C Reverse Strobe from gate E30A, which can result only with Recover Page (RPP). However, in addition a Reverse state is established by flip flop E18A which remains true only while the Stepper Motor 100 is set in motion, elsewhere in control logic 150; that is, E18A is set only with Halt (motor stationary) and is reset with the next successive Halt Reset (motor again stationary).

The Initialization circuit, located in logic block 160, see FIG. 9a, determines the initial conditions of all flip flops, registers, and counters throughout the control logic 150 circuits. In particular, it resets the following: D16A, D16B, E18A, C17A, D27A, C27A, C14A, C22A, C22B, B17B, D27B, C16B. The Initialization circuit generates a delayed positive-going level whenever 12 vdc becomes available, and employs a fairly conventional design to develop the Not Initialize signal. The initial low logic level (350 msec) in duration, as will later be seen, lasts long enough to allow register 171 comprising devices A2 and A6 to shift ones all the way up to the 15th stage. As previously determined the initialization circuit conditions the logic controls for the Prep mode, wherein the machine is in situation for the operator to program a particular reproduction run or Job.

A Ready (RDY) signal denotes proper operating conditions for the duplicating machine 11, 12, 13 with either Auto feed mode, or Single feed mode established. Logically, when the machine is in the Ready condition, it signifies the following equation:

$$\text{CRDY} = \overline{(\text{Check Intlk}) \cdot \text{Prep}} \cdot \overline{\overline{[(\text{SIP} + \text{JIP} + \text{INIT}) \cdot \text{AJIB} \cdot \text{RPP}} \cdot \overline{\text{CJAM}}}$$

| | | |
|---|---|---|
| Where | $\overline{\text{Check Intlk}}$ | = no interlocks open |
| | $\overline{\text{Prep}}$ | = not in Prep. mode |
| | $\overline{(\text{SIP} + \text{JIP} + \text{INIT})}$ | = not in (Slew in progress or Job in Progress or Initialize) |
| | $\overline{\text{AJIB}}$ | = host machine not busy |
| | $\overline{\text{RPP}}$ | = not in Job Recovery mode |

-continued

| | |
|---|---|
| $\overline{\text{CJAM}}$ | = no forms jam exists |

The last four signals of the above combine in NAND gate C18A, the output of which combines with signals Prep and Ck Intlk to produce CRDY at the output of NOR gate D20A. The output of D20A passes through a non-inverting gate E4C and transistor Q5 to turn on triac T5, which in turn causes the Ready lamp on the control panel 130 to illuminate.

With no material D present under sensors 86, 87, and 88, the signals named Form Sense A and Form Sense B, respectively, both attain low logic levels and combine at NOR gate C5A to produce a No Forms Signal. Ultimately the latter combines with Job Complete in D23C and A Start Print in D23B to obtain a Check Forms Path condition by way of D25A. The C Jam through D25A signal also forces Check Forms Path level high. The combination of these variables produces the following logic equation:

CHECK FORMS PATH = C JAM + (A START PRINT)(NO FORMS) + (JOB COMPLETE)(NO FORMS) (2)

Either one of three above conditions turns on triac T6 which applies 14 VAC across a suitable Check Forms Path lamp to indicate this condition.

During a Job Recovery Mode of the host machine 11, the control logic 150 receives a signal called A Job Recovery. This signal sets flip flop C17A in the Host Machine Signal Conditioning logic 165, FIG. 9d, and the resultant output of C17A named Recover Proper Page (RPP) turns on triac T9. Consequently, a suitable Recover Page lamp is turned on to denote to the operator that the Reverse switch 132 must be actuated to return one or more frames of the material D to the platen for re-exposure and reproduction by the host machine 11.

The System State and Transition logic block 162 generates a signal called Job Complete in flip flop C27A ($\overline{Q}$ output) when the programmed number of frames of the material D has been reproduced in the reproduction machine. Whenever Job Complete signal goes high, it enables triac T7 of logic block 160 which in turn illuminates a suitable Job Complete lamp. The Job Complete flip flop C27A in logic 162 attains a Not Job Complete status for three event signals: (1) Initialization, (2) Keystrobe, and (3) Tractor Cover Open, during which time for all three of these events, the machine is not reproducing as programmed. This flip flop becomes set to Job complete condition when Halt, generated in the Form Length Counter logic block 166, clocks in End of Job (low), produced in C14A ($\overline{Q}$ output).

FIGS. 7 and 8a also illustrate how the control panel 130 interfaces with the Feed Quantity program counter logic 163. It is to be noted that the program counter logic receives 12 input lines that relay feed quantity information from the Feed Quantity switches 133, 134, and 135 to the program logic. The program logic in turn, outputs 10 lines to the panel 130 that convey information such as the panel or form number situated on the platen 14 at any particular time, as displayed in the numeric indicator 146 (see FIG. 7).

The Counter logic 163 performs several important functions. In its first function, it stores the feed quantity number, registered by switches 133, 134, and 135, by the operator, as the number of frames to be reproduced, and decrements this number as the host machine processes each form. In its second function, it keeps account of the number of panels of the material D that have been copied (flashed) by the host machine. During a Job In Progress (JIP) sequence this number plus one becomes digitally displayed as a presentation of the current frame page being processed in the indicator 146. Otherwise, when no job is in progress, the indicator 146 displays the Program Quantity.

The Counter 163, and associated display 146, also provide a third feature in the case of slewing an extended preselected number of frames in the Prep mode. In this operation the display 146 increments upwardly from zero, counting the frames of material D as they pass the registration edge 48. By way of a fourth function, it is notable that if forms are indexed in Reverse, as during a Job Recovery with Job in Progress, the counter reverse counts (increments) corresponding to correct frame in registration.

FIGS. 9c, 10a, and 10b illustrate a complete schematic of the logic in Feed Quantity Program Counter 163 required to perform these multiple tasks. To achieve these functions, the circuit comprises the Up/Down counter 163a for storing feed quantity data, and subtraction logic 163b for obtaining the proper document number. Each is connected to a common set of terminals 163c as illustrated, the terminals being connected back to the 3-decade BCD-encoded Feed Quantity selector switches 133, 134, 135 on the control panel 130.

As shown, the Up/Down counter 163a is implemented with three 4-bit decade integrated circuits, consisting of U10, U11, and U12 for the units, tens, and hundreds digits, respectively. Four control lines manipulate this counter as dictated by the mode of operating and other logical blocks. The first of these lines: Reverse, from E18A in block 160, when low, allows the counter to count Down in the Auto Feed, Single Feed, and Advance modes of operation, and when high selectivity during Job Recovery, it enables Up counting. The second of these lines: Cycle Up, occurs as a single pulse at the beginning of each job and enters the feed quantity data, 163c into presettable input registers within the Up/Down counter 163a. The third line: Page Quantity Clock, decrements or increments the counter for each form moved forwardly or backwardly, respectively, across the platen 14 as per the Reverse line level. The fourth line: Cycleout, resets the Up/Down counter to zero as an outcome of terminating any sequence. This line also zeroes the counter during Initialization and prepares it for the next feed quantity entry.

The subtraction logic 163b essentially performs 10's complement arithmetic by means of 9's complement-plus-one implementation. The need for subtraction logic in the present invention becomes obvious when it realized that the Up/Down counter stores feed quantity data and counts down from some arbitrary number to zero; whereas, the digital display 140 starts at zero and counts up in correspondence with the number of frames of material D indexed, or advanced. Hence, the requirement for subtracting the Up/Down counter value from the number set on the Feed Quantity switches 133, 134, and 135. As an example, assume the feed quantity switches 133, 134, and 135 have been programmed for 20 as noted in FIG. 7 and no forms have been advanced. In this case, the digital display as illustrated on the indicator 146 should show zero (000), as at the beginning of an Advance operation. At this point,

| | BCD | | | Decimal |
|---|---|---|---|---|
| The Feed Quantity sw (A) | 0000 | 0010 | 0000 | 020 |
| Up/Down counter output | 0000 | 0010 | 0000 | 020 |
| The complement logic shows (B) | 1001 | 0111 | 1001 | 979 |
| By adding these two numbers we obtain (A) + (B) | 1001 | 1001 | 1001 | 999 |

one less than the required zero. Thus, it becomes necessary to add one to the sum to obtain zero. Performing complement 9's addition gives:

| | BCD | | | Decimal |
|---|---|---|---|---|
| (A) | 0000 | 0010 | 0000 | 020 |
| (B) | 1001 | 0111 | 1001 | 979 |
| (A) + (B) | 1001 | 1001 | 1001 | 999 |
| +1 | | | +1 | +1 |
| (C) (1) | 0000 | 0000 | 0000 | 1000 |

Since the carry digit is truncated by virtue of exceeding the capacity of available counter register space, it drops out and the result equals zero.

However, in the case of running a Job, as when either Auto or Single feed mode may be selected, and the host processor has been engaged into operation, as defined by the Job in Being (AJIB) signal in the Controller 150, (output of 165), it must be noted that the Job is commenced with the first document frame already properly registered on the glass platen 14. Reproductions of this page are made, and then the apparatus 40 advances document material to the second frame of the Job, etc. In this situation, it is desirable to display the frame number currently on the glass platen, starting at one.

It will now be assumed the original quantity of 20 remains the same and four forms have been processed, with the fifth frame registered on the glass platen, in the course of being processed.

In this case, the numbers come out as follows:

| | | BCD | | | Decimal |
|---|---|---|---|---|---|
| feed quantity number | (A) | 0000 | 0010 | 0000 | 020 |
| Up/Down counter | | 0000 | 0001 | 0110 | 016 |
| complement logic | (B) | 1001 | 1000 | 0011 | 983 |
| | A + B | 0000 | 0000 | 0011 | 1003 |
| | | | | +1 | +1 |
| | | 0000 | 0000 | 0100 | 1004 |

Note the result is 4, one less than the page number of the document frame registered and in process. Therefore, another addition of one becomes necessary when a Job is in progress. On completing this addition, the final numbers are:

| | | BCD | | | Decimal |
|---|---|---|---|---|---|
| feed quantity number | (A) | 0000 | 0010 | 0000 | 20 |
| Up/Down counter | | 0000 | 0001 | 0110 | 16 |
| complement logic | (B) | 1001 | 1000 | 0011 | 983 |
| | A + B | 0000 | 0000 | 0011 | 1003 |

-continued

| | BCD | | | Decimal |
|---|---|---|---|---|
| +1 | | | +1 | +1 |
| | 0000 | 0000 | 0100 | 1004 |
| +1 | | | +1 | +1 |
| | 0000 | 0000 | 0101 | 1005 |

The resultant display on indicator 146 now specifies the desired information that the fifth document frame is upon the platen and in process, (but only four have been advanced), from the commencement of the Job.

Referring now to FIGS. 10a and 10b, the following table lists the functional implementation described above:

| Function | Units | Tens | Hundreds |
|---|---|---|---|
| Up/Down counter | U10 | U11 | U12 |
| Complement Logic | U20 | U21 | U22 |
| First Adder | U13 | U14 | U15 |
| Second Adder | U16 | U17 | U18 |

The output from the second adder feeds a multiplexer 163d, composed of U26 and U25, that sequences the units, tens, and hundreds to a 7-segment decoder U27 in 163e for driving the digital display 146 on panel 130. Each digit on display receives 7-segment decoder data during the enabling period of DIGIT 1, DIGIT 2, and DIGIT 3. Sequencer 163f, comprising shift register U38 and miscellaneous gating logic, generates the necessary timing for digit enables and multiplexer addresses.

Zero blanking of the tens and hundreds digits within the 3-digit display 146 is accomplished by logic 163g and occurs whenever gate U23 detects all zeroes from U17 for the tens inhibit, and gate U24 detects all zeroes from U10 for the hundreds inhibit. They combine in gate U19 to inhibit sequences of U38 outputs that enable DIGIT 2 and DIGIT 3 of the digital display. Zero blanking of these leading zeroes is utilized in the invention to avoid some confusion on the part of the operator in reading the display, and to enhance the appearance of the same, in that its numeric content is displayed in a conventional manner.

Another function of the Feed Quantity program logic is its capability to detect an all zero condition of switches 133, 134, and 135. When this happens during a No Job period gates U41a, U41b, U43a, U42a, U43 and U40 combine to inhibit an output from U27 the 7-segment display decoder. A decoder, composed of gates U23b, U24b, U43b, and U42b, detects a condition when the Up/Down counter has one count left. At this point in time the decoder generates a pre-coincidence signal (PRECOIN) used in other portions of the control logic 150.

The Forms Length counter 166 receives its input from switches 136 and 137 on input panel 130 by way of terminals 166a in the panel. As shown in FIG. 9e, five lines interface these switches to the Form Length counter preset inputs. These five lines represent form length switch positions in pure binary format. The Forms Length counter shown in block 166 comprises five stages where the first four stages implement with the counter circuit B1 and represents one inch lengths of the material D, and the last stage (flip flops B8A and B6A) one half inch lengths. Each clock pulse, ck/100 applied to B1, represents material movement, forward or reverse of one inch and each clock pulse, ck/50 administered to B6A, represents material movement one half inch.

Figure 12:
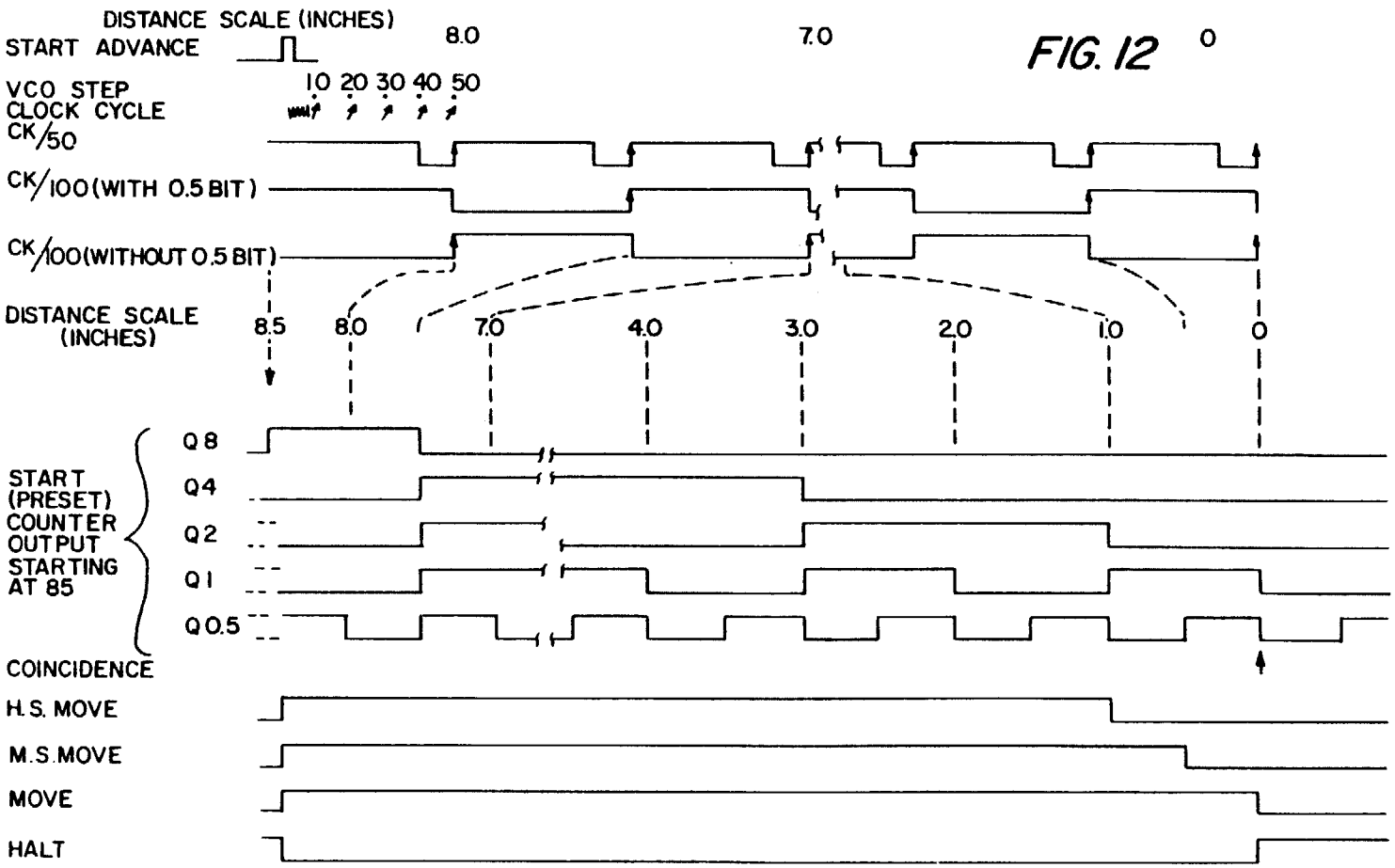

As an example, assume that a frame or panel length of 8.5 inches was preset in the control panel 130 as shown in FIG. 7. In this case, the Forms Length counter becomes set to a binary number 10001 with the MSB position denoting eight inches and LSB position denoting one half inch. If the material length selected was 8.0 inches, then the counter obtains 10000 as the initial binary number. A phase relationship exists between these two examples such that for the first case (8.5 inches), where B8A is set signifying the presence of a 0.5 bit, counter B1 uses the true ck/100 clock. For the second example, form length of 8.0 inches, the B1 counter uses the inverted ck/100 clock. FIG. 12 illustrates this relationship for both examples and illustrates the initial start of B1 from preset count of 8.5 and its downcounting to Forms Length Coincidence.

The actual presetting or loading the Forms Length counter 166 occurs for anyone at the following system events (pulse signals): (1) Slew cycle, (2) Job cycle, and (3) Recycle. Any one of these signals generate a Start Forms Move Cycle pulse, at the output of B9A that clocks in the LSB switch position into B8A, and enables the states of P1, P2, P3, and P4 inputs of B1 to be loaded into the counter.

For the example of 8.5 inch forms length, flip flop B8A becomes set high and allows the Start Forms Move Cycle pulse to preset B6A to a high thereby acknowledging the presence of a one-half inch forms length. On the other hand, for the 8.0 inch form length, the Start Forms Move Cycle pulse clocks B8A low which in turn allows the Start Forms Move Cycle pulse to reset B6A. The latter flip flop status denies the presence of a one-half inch forms length.

Coincidentally with the above occurrences, the Start Forms Move pulse initiates a Move Cycle in the Move Cycle Processor block 167 which propagates to the Velocity Contour logic block 168, during which cycle a Step Clock, generated by mutual coordination among the bocks 168, 169 and 170, the latter two being a voltage controlled oscillator circuit, and a Divide-by-Eight logic, respectively, become available. Prior to this Move cycle the Step Clock was inhibited and the Forms Length counter 166 reset to zero, by the Halt signal produced in logic 167.

The output of the Divider block 170, the Step Clock, is passed on to Step Clock Divider counters composed of B11, and B12 in the Forms Length counter 166. Counter B11, being a decade counter, divides the incoming Step Clock by ten. This wavetrain, (Step Clock)/10, becomes a clock input to counter B12, and B12, being implemented as a divide-by-five, produces a ck/50 clock. When ck/50 toggles B6B, it produces an output ck/100 that ultimately clocks the original Forms Length Counter B1. It is to be noted that the output of B6B, two phases of ck/100, feed into an exclusive OR gating function controlled by flip flop B8A, that determines the ck/100 clock phase applied to counter B1 as discussed above. Decoder C10 detects a Form Length Precoinc condition that connects to Move Cycle Processor logic Block 167. This block will be discussed below in greater detail.

In the Advance mode of operation, the Form Length logic requires an initiation of a Move Cycle upon depression at the Advance Feed Switch 131. The move cycle during Advance, may selectively be of Single Stop action, wherein forms are moved in single frame increments, or otherwise of multiple frame Slew action, in which forms are moved in continuous high speed motion for an integral number of frames. The latter activity demands that logic 166 counts Form Length a multiplicity of times, as determined by a control signal, Hold in Slew, which is delivered by System State logic 162. In fact, as will be realized hereinafter, the Slew operation is programmable according to a nonzero selection on the feed Quantity selectors 133, 134, 135 during Advance mode.

The Forms Length logic 166 recycles itself in the following manner. During a Move Cycle, flip flop B6A gets toggled by ck/50, and in essence, generates a clock of freq. (ck/100)' which is in fact the counting of the 0.5 data bit. This clock inputs the status of B1's carryout, NOT CO, into flip flop B19A. Initially with NOT CO at a high level B19A sets high and when NOT CO goes low, indicating a zero count in counter B1, B19A gets reset to zero on the rising edge of clock (ck/100)'. When a signal called Step Complete, generated by logic block 170, changes from low to high it resets flip flop B19B to zero. This condition together with high levels of Hold in Slew, (HIS) from logic 162, and flip flop B8B ($\overline{Q}$) results in a negative output from NAND gate B9B. This output goes positive once again at the lagging edge of Step Complete that sets flip flop B8B low and inhibits NAND gate B9B. The Recycle output from this gate starts the Move Cycle sequence all over again, continuing until such time as Hold in Slew falls low, disabling B9B. The Form Length Logic 166 operates identically, whether initiated by Advance or Reverse operation. In the Reverse movement of the material, which is generally utilized in Job Recovery, operation of the Reverse switch 132 has been restricted such that only one panel is moved for each actuation.

Figure 13:
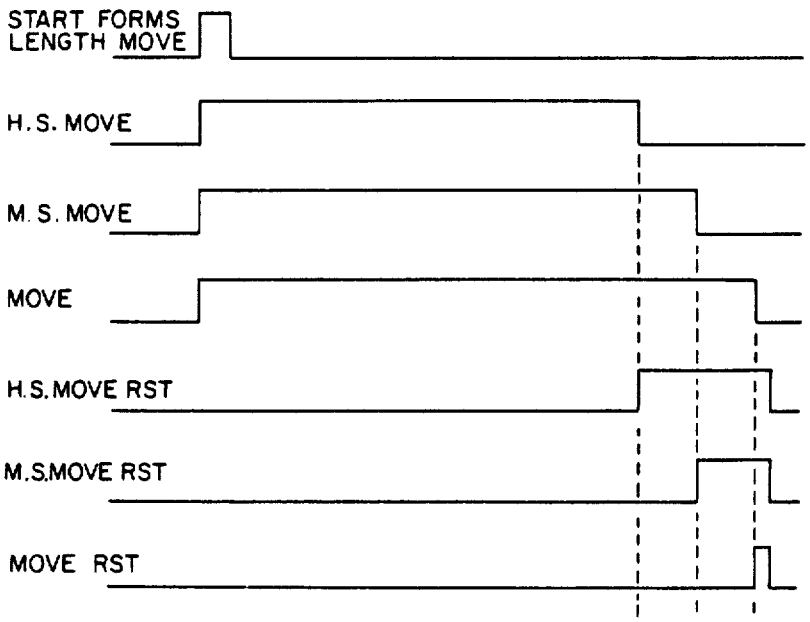

The Servo Move Cycle Processor, logic block 167, consists of three basic flip flops: (1) High Speed Move C9A, (2) Medium Speed Move C9B, and (3) Move, (Not Halt) C14A. When set by a Start Move Cycle pulse from B9A in logic 166, these three outputs enable various functions throughout the control logic 150. In particular, they enable logic block 169, 170, and 171 to operate and produce a variable frequency clock signal used to develop the Step Clock which is representative of the angular stepping action of Stepper Motor 100. Additionally, Move conditionally controls logic blocks 163 and 172. A basic function of Halt (=Not Move) pertains to initialization of counters, registers and flip flops throughout logic blocks 160, 164, 167, 168, 170, and 172. FIG. 13 illustrates a basic Move cycle and sequential resets of the three flip flops. That is:

| | | | | |
|---|---|---|---|---|
| H.S. Move RST = | A | $\overline{B}$ | $\overline{C}$ | (3) |
| M.S. Move RST = | A | $\overline{B}$ | C | (4) |
| Move RST = | A | $\overline{B}$ | D | (5) |

Where

A = Form Length Precoincidence from C10

$\overline{B}$ = Not (Hold in Slew)

C = Form Length Counter 0.5 Bit from B6A $\overline{C}$ = Form Length Counter Not 0.5 Bit from B6A ($\overline{Q}$)

D = Form Length Coincidence pulse from C13A

When referenced to Step Clock, the staggered resets of FIG. 13 represent 100 Step Clock pulses for equation (3) and 50 Step Clock pulses for equation (14). That means the H.S. Move and M.S. Move reset 100 and 50

Steps respectively prior to the end of the Move Cycle for this particular design example.

When applied to the Velocity Contour logic block 168, H.S. Move and M.S. Move contribute to full speed and half speed material D movement, respectively, across platen 14. With both flip flops enabled, the material D moves at full speed and with M.S. Move enabled, the material moves at half speed. The reset of M.S. Move initiates a further reduction of material movement to a point where after 50 Step Clock pulses, the material D slows to a very low speed and Move becomes reset, at which point, the Move Cycle ends and material D is stopped in a new position of registration.

The beginning of a Move Cycle enables the Velocity Contour logic 168 and the Voltage Controlled Oscillator 169 to function. In particular, as seen in FIG. 9F, a Halt (Not Move) signal, passing through NAND gate C13A, enables C13B to place a low on the inverting input node of comparator C12D. With unequal input voltages, C12D Slews toward zero and contributes zero volts at an inverting summing node of C12A. The dominant voltage at this point then becomes the output from integrator C2A.

Figure 14:
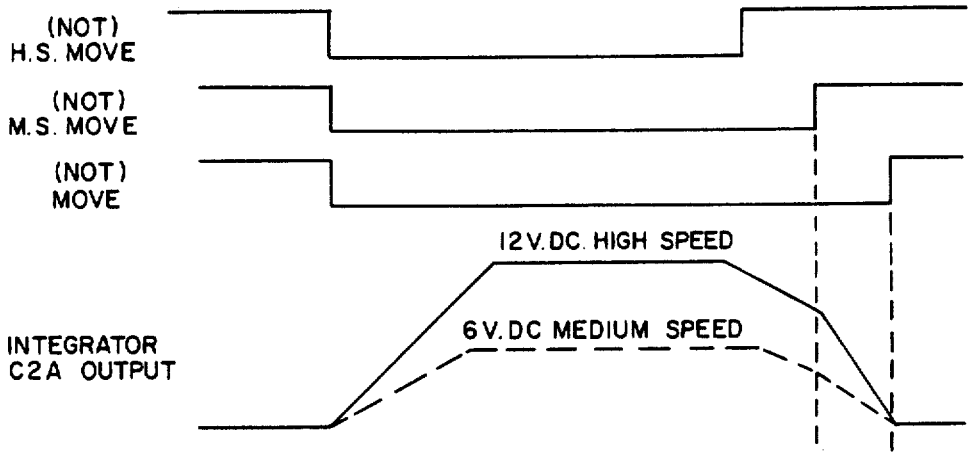

When Not H.S. move and Not M.S. Move both go low applied at the inverting node of C2A, the output from the integrator, measured at pin 14, starts to increase linearly as shown in FIG. 14. It increases to C2A's saturation point and then levels off as shown. Normally, with comparator C12C outputting a high, the integrator's open collector output swings from 0 to +12 VDC. However, by placing a high signal at any input of NOR gate C30, such as, for example, selection of Slow operation, if desired, or Reverse, the output from C12C goes low and divides C2A's outputs across resistors in voltage divider arrangement. As a result, the integrator output voltage swing is limited to some intermediate voltage; for example, to 6 volts; that is, the voltage at point A might vary from 0 VDC to 6 VDC and then back 0 VDC. As shown in FIG. 14, an integrator output of +6 volts effects medium speed to the motor 100 whereas an output of +12 volts effects a high speed. While, the voltage divider in block 168 provides a single intermediate voltage output and is shown only for illustration purposes, the divider may be modified, or others added, to effect another, or multiplicity of other intermediate speeds, as well as high speed operation. The actual voltage decay starts when Not H.S. Move changes from low to high, continues through the Not M.S. Move transition, and ends with Not Move changing states.

It is to be noted that the leading and trailing slopes, and therefore accelerating and decelerating rates of the Stepper Motor 100 may be adjusted and contoured variously and independently. For example, the integrating slope (time constant) may be variously adjusted by scaling input resistors RIa, RIb . . . RIn, programmed by a digital input word, comprising Ia, Ib . . . In, providing a time integral analog output of time-variant digital input pattern, which may be used directly (as at 14) or further scaled (as at A) or programmably sealed in time variant fashion if so desired. Hence, blocks 167 and 168 together, and expanded in generalized form, provide an Integrating Digital-to-Analog Converter System. Furthermore, blocks 167, 168 and 169, together and generalized, perform an Integrating Digital-to-Frequency converter.

When applied to the input to the Voltage Controlled Oscillator (VCO) 169, this varying voltage developed in 168 controls the VCO output frequency. Basically implemented as a fast integrator circuit, the VCO starts oscillating at a frequency of 1.6 KHZ immediately after C13B reaches zero volts. As the voltage at point A of the voltage divider increases, the VCO frequency also rises, and eventually reaches a frequency of 16 KHZ if +6 VDC is applied as in medium speed, or a frequency of 32 KHZ if +12 VDC is provided. Thereafter, during the voltage decay duration, the VCO frequency decreases back to 1.6 KHZ again. At the conclusion of Move Cycle the VCO oscillation is forced to stop completely, by returning C12D low by way of Halt and C12B high at C13B inputs.

Figure 15:
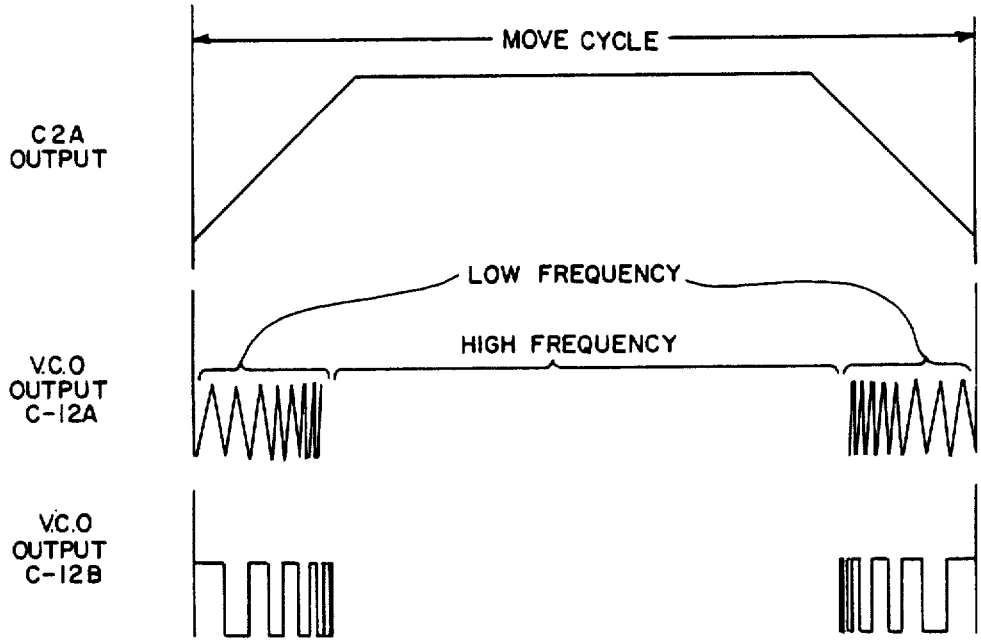

FIG. 15 illustrates a velocity contoured VCO intermediate triangular output at integrator C12A during a single Move Cycle and the final squared output from comparator C12B at the end of a Move Cycle, the output of C12B stays at a high level, arming NAND gate C13B, so that the sequence is repeated for another velocity contoured VCO frequency burst in a successive Move Cycle.

Figure 16:
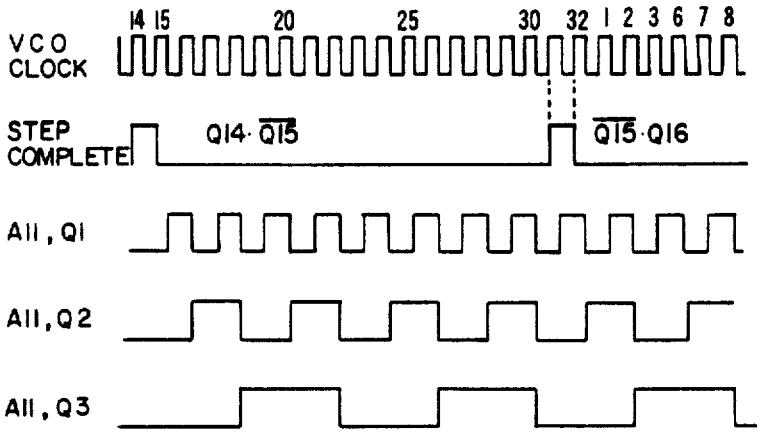

The Move Cycle also enables Divide by Eight block 170 to function, as shown in FIG. 9g. In particular, block 170 takes the VCO Clock signal and divides it by eight. Since the VCO Clock signal varies from 1.6 KHZ to 16 KHZ signal, or to 32 KHZ, depending on the Velocity Contour voltage output, the step clock generator (All) produces a Step Clock signal that ranges from 200 Hz to 2 KHz for 16 KHz signal, or to 4 KHz for a 32 KHz signal. Initially set to zero by a Not Move Halt signal, block 170 becomes enabled during the Move Cycle and accepts VCO Clock pulses. It does not start to count, however, until the first Step Complete pulse is produced by B15A, which receives outputs from the Phase Generator Divider logic block 171, ($Q14.\overline{Q15}$), decoded by NAND gate B10A. Step Complete sets All to zero and allows it to count until another decoded Step Complete pulse, decoded as $\overline{Q15}.Q16$ by way of B10B in block 171, arrives at All and synchronizes the Step Clock with Step Complete. The Step Clock generator continues this sequence until completion of Move at which time Step Clock output ceases. FIG. 16 illustrates the timing of All relative to Step Complete and Move. The Step Clock is the basic clock for the Forms Length Counter logic 166. For every 100 Step Clock pulses, the computer fanfold material D moves one inch.

As shown in FIG. 14, at an output approximating 0 volts for the integrator C2A, the VCO oscillates at a frequency of 1.6 KHz. At this point, the Step Clock generator generates 200 pulses per second representing advancement of the material at one inch per half second. At a frequency of 16 KHz pulses, stepping rate is at 2 KHz. As will be described hereinafter, each Step Clock pulse specifies the rotation of the stepper motor 100 one of its steps, and with the motor being devised to produce one complete revolution for every 200 steps, a 2 KHz pulse rate will effect 10 revolutions of the motor and concomitant movement of the material D at 20 inches per second. With the processor 11 having a processing speed of 20 inches per second, and the speed of movement of the material D at medium speed also being 20 inches per second, the production rate for the reproduction system is diminished from the full production rate of the processor. If the processor 11 is capable of two copies or impressions per second, with the system, incorporating apparatus 40, during a form advance operation, only one copy present will be produced in the system whereas the time during which the second copy would have been produced is utilized instead to complete the positioning of a panel onto the platen and ready the processor for additional copying. However, with the apparatus 40 operating at high speed, which effects transportation of the material D at up to 40 inches per second, the loss in production rate as in the above example may be avoided, and full production capacity therefore realized.

During the Initialization period, the Voltage Controlled Oscillator 169 (VCO) clock is momentarily enabled such that it shifts in all ones into the first 13 stages of the shift register in the Four Phase Generator 171 comprising A2 and A6. This prepares the shift register for generating correct four phase waveform as well as Step Complete pulses utilized in the System State and Transition logic block 162 and the Divide by Eight block 170 during a Move Cycle.

Figure 17:
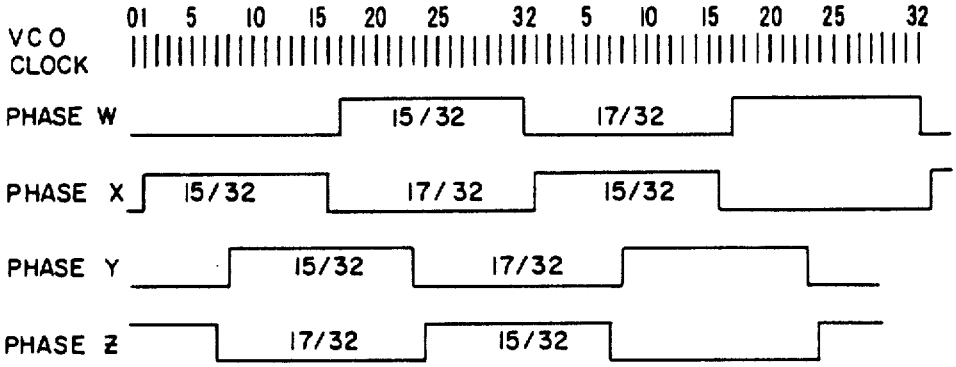

When VCO Clock becomes available during a Move Cycle, the first pulse sets Q14 high and together with Not Q13 create a Step Complete. On the next clock pulse Q15 goes high and Step Complete terminates, and because the D input to A2 goes low, the shift register begins shifting in zeroes. As the zeroes progress down the register, the 17th clock pulse shifts a low into Q15. It combines with Q16 to generate a second Step Complete pulse. The zeroes continue to shift into the register until clock pulse 19 at which time, with zeroes reaching Q17, the output of NAND gate A7A goes high and the shift register starts clocking in ones. At clock pulse 32 the shift register contains ones up to and including the 13th stage and is set to repeat the sequence once again. In addition to generating a Step Complete pulse train, the shift register produces the four phase sequences W, X, Y, Z for incrementing the stepper motor 100. FIG. 17 illustrates these phases in relation to one another. It is to be noted that the duty cycle of each phase is 15/32 of the total shift register cycle. The phases W and X connect to the Stepper Motor Drivers 173, and phases Y and Z connect to the Hold/Run and Direction Gating logic block 172, the logic for controlling stepping motor direction of rotation. It should be noted that Step Complete pulses are produced for the purpose of synchronizing the Step Clock emanating from Divider logic 170 with the actual angular stepping activity of the motor 100, as determined according to the four phase signals W, X, Y, and Z.

The System State and Transition logic 162, which is shown in FIG. 9d, sets up various memories that reflect different operating conditions within the main logic 150. These comprise the following flip flops: (1) P.Q.≠0, signifying that a Feed Quantity has been programmed, (2) Hold in Slew (HIS), (3) Slew In Progress (SIP), (4) Job in Progress (JIP), (5) Job Complete (JC), and (6) End of Job. In addition to these flip flops, a sequencer, consisting of B17A, B21, C24A and C25A, generates pertinent timing strobes. The sequencer becomes enabled and develops these strobes during (SIP or JIP or INIT).

Three Prep modes of operation will be discussed in order to illustrate the primary roles that these memories perform in the System State and Transition logic. The first mode involves the situation where the Feed Quantity Program Counter 163 holds a zero, and the system indicates a PREP mode. In this instance, an actuation of the Advance switch 131 causes the fanfold material D to move one complete panel or frame forward and then stop. Additional actuations of the Advance switch produce the same results, the fanfold material moving forward by one panel for each actuation.

The System State and Transition logic achieves this result with the help of the logic blocks 163 and 166 in the following manner. Strobe C ADV STR toggles flip flop C16A (HIS) to a high state which in turn directly sets C22B (SIP) to a high. When this happens, it initiates one cycle of sequencer B17A and associated timing strobes. Strobe Cycle Up loads the status of Feed Quantity switches 133, 134, 135 as by the operator (in this case zero) into counter 163. As a result Not Program Quantity (P.Q.) Coincidence out of the carry output of counter 163 stays low and strobe $Q2.\overline{Q3}$ clocks in a zero into C22A, the P.Q.≠0 flip flop, therefore developing P.Q.≠0.

With SIP high, the same strobe passes through gate C25B and becomes Not Slew Cycle and initiates a Move Cycle in logic blocks 163 and 166. Additionally, Not Slew Cycle passes through gates D30A, D30B, and C23A to reset HIS flip flop C16A. With this flip flop reset, the output of gate D20A (HIS.P.Q.≠0.$\overline{JIP}$) changes to a low and inhibits logic blocks 166 and 167 from recycling. As a result, after the material moves through one Form Length position, the Move Cycle ends and results in an output from gate B18 shown in FIG. 9f, called Halt Reset that zeroes flip flop C22B. With this change, the logic prevents any further forms movement and completes the sequence generated by actuating the Advance switch while the system is in the Prep mode.

The second Prep mode of operation involves similar conditions as above but with the Feed Quantity switches 133, 134, 135 set to one. Actuation of the Advance switch 131 causes the material to move one panel as before but the logic behaves somewhat differently. Once again Cycle Up loads counter 163 but now Not P.Q. Coinc goes high and strobe $Q2.\overline{Q3}$ clocks a high into flip flop C22A producing P.Q.≠0. The flip flops C16A and C22B become set to a high state in a manner as described above. This results in Now Slew Cycle strobe and a (HIS.P.Q.≠$\overline{JIB}$) high out of gates C25B and D20A respectively. The strobe places logic blocks 166 and 167 into a single Move Cycle as before, but a high Not P.Q. Coinc input at gate D30A inhibits Not Slew Cycle from resetting C16A. This situation rectifies itself when a Job Sequencer logic block 164a to be further discussed hereinafter generates a P.Q. Count pulse upon receiving a Start Forms Move Cycle from logic block 166.

As a result of receiving a P.Q. Count pulse, counter 163 decrements to zero and Not P.Q. Coinc reverts to a low. Consequently, the low level output of gate C13D follows a path through gates C11, C30B, in the Final Forms logic 161, and C23A to reset C16A. Once again the low output from gate D20A restricts logic block 166 and 167 to a single Move Cycle at the end of which time Halt Reset zeroes C22B. Sequencer B17A then clocks in a zero into flip flop C22A, by way of C24B and ends this particular mode of operation.

The third mode of operation in Prep occurs when the Feed Quantity switches 133, 134 and 135 have been set to a number greater than one, such as for example, when the operator desires to quickly move through a large number or a particular number of fanfold material panels either prior to, or after reproducing some portion of the material. In this case, actuation of the Advance switch 131 results in rapid continuous advancement of the fanfold material through the tractor module to the preset number, or to the end of forms material, which ever comes first, and in any case, delivering some one frame in registration upon stopping.

As an example, assume the switches have been preset to 20. In this case, the Feed Quantity Counter 163 becomes preset to 20 and flip flops C22A, C16A, and C22B become set as in previous modes. Now, however, C16A stays set until the occurrence of Not P.Q. Coinc. which happens only after 20 panels have passed through the tractor module. The fact that C16A stays high allows (HIS P.Q.$\neq$0.$\overline{JIP}$) to stay high which recycles the Length Counter logic block 166, a total of 20 times. Each time the Recycle is produced from a Form Length coincidence, it generates a P.Q. Count, from logic block 164a, that decrements Feed Program Quantity counter 163a. Thus, taking into account the initial P.Q. Count pulse generated by Not Slew Cycle plus 19 more generated by Recycle, the Feed Quantity Counter 163 decrements to zero.

When the Counter 163a reaches zero, shortly after the beginning of the last move cycle, it results in resetting of flip flop C16A as explained in the second operating mode above. This causes (HIS.P.Q.$\neq$0.$\overline{JIB}$) to go low which inhibits another Move Cycle and the material D stops moving upon Form Length coincidence. Flip flops C22A and C22B become reset in the same way as previously described.

To understand the function of the last three flip flops in the System State and Transition logic 162, consider the Run mode of operation. Actuation of either switch Single Feed 138 or Auto Feed 139 places the continuous forms feeder apparatus 40 into a Run mode. In order to actually move any frames of the material, however, the host machine Start Print switch 142 must be actuated. If Single Feed has been selected and the Start Print actuated, the following happens:

Flip flop C27B, Job in Progress (JIP), becomes set according to logic equation 7 below:

$$(JIP) = (A\ START\ PRINT)\,(A\ RDY)\,[(C\ RDY)\,\overline{(SIP + JIP)}\,\overline{(NO\ FORMS)}] \qquad (7)$$

| | | |
|---|---|---|
| where $\overline{NO\ FORMS}$ | = | Forms have been detected in the Platen Module |
| $\overline{(SIP + JIP)}$ | = | Not (Slew in Progress or Job in Progress); that is, neither of these machine states currently exist |
| C RDY | = | Continuous Forms Feeder is Ready to operate |
| A RDY | = | Host machine is Ready to operate |
| A START PRINT | = | Host machine Start Print has been pushed |

Flip flop C27A, Not Job Complete, becomes set by a Keystrobe pulse passing through NAND gate C23C. With the flip flop C27B set, it allows Flash Coinc. A pulse derived in Host Machine Conditioning block 165, to pass through gates C24D, C11, and D25B and output it as Not Job Cycle. This particular pulse occurs after the host machine has flash illuminated the last exposure of the frame situated on the platen, and places Length Counter 166 and Servo Move logic 167 in a Move cycle.

As with the previously described Move cycles this one results in decrementing the Feed Counter 163 by one and advancing the material forward one position. Nothing else happens if the Program Counter 163 holds a number greater than one. If, on the one hand, it does hold a one and decreases to zero during the Move cycle, it results in setting flip flop C14A (End of Job) high with the resultant termination of machine operation along with clearing of the Job (JIP), C27B, and presentation of Job Complete, C27A.

The actual pulse that sets C14A originates at NAND gate C13D as Not P.Q. Coinc$\neq$0, becomes inverted by C11, and passes through NOR gate C30A in block 161 before reaching the flip flop. The Not Q output of C14A connects directly to C27A's D-input. When Halt (Not Move) comes along at the completion of a Move cycle, it clocks in a zero into C27A. The Not Q output here represents Job Complete, and when it goes high, it resets C14A. An output from logic block 164A named Job Status Strobe monitors NOR gate C30A and when it goes low it clocks a zero into C27B (JIP). With JIP reset, the Single Feed sequence completes itself.

An Auto feed selection followed by the host machine Start Print actuator activates the same flip flops just described, and provides a second Run mode of operation. Flip flop C27A sets with Keystrobe and C27B sets in accordance with logic equation (7). With this latter device set Flash Coinc A, originating in logic block 165, again triggers the Move cycle for every occurrence. However, during this mode of operation, a strobe is produced in Sequencing logic 164, called Delayed Start Print, that simulates the host machine's Start Print actuations and maintains the F1 Coinc A pulse train for as long as necessary to decrement counter 163 to zero. Therefore, an automatic Run cycling loop is closed, and in fact, the A Start Print signal in equation (7) is merely a reflection of the Delayed Start Print strobe. Toggling the Auto Feed switch or depressing Single Feed, or running out of forms will terminate the Auto Feed Run Mode and thus, also stops Delayed Start Print from initiating the host machine, allowing it to cycle out.

As shown in FIGS. 9e-9f, Sequencing Logic block 164 includes job sequencing portions 164a and 164b. Logic 164a consists of a 4-stage register B17B and associated decoder gates. For every Start Forms Move Cycle pulse, it generates a sequence of pulses. Logic block 163 uses the P.Q. Count Strobe signal to decrement Feed Quantity counter 163a and Final Form Tracking logic block 161 uses it as a sequence clock to generate Final Form Coinc. The Job Status Strobe, used in logic block 162, clocks JIP flip flop C27B searching for the occurrence of Final Form Coinc. or P.Q. Coinc., and thereupon causes the Job to terminate.

Figure 18:
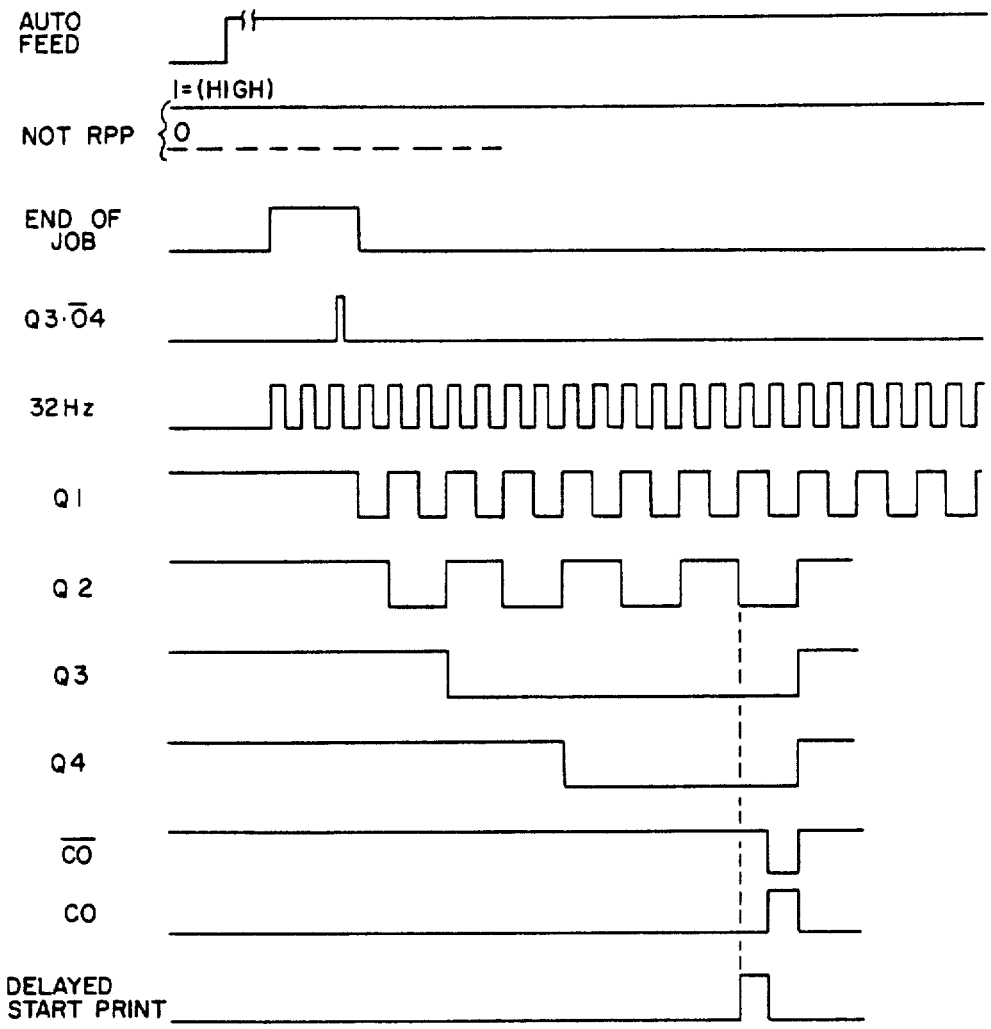

One other function that this Sequencer 164a performs relates to logic block 164b, the Output Timing logic. For example, it may initiate logic block 164b during the time Q3 $\overline{Q4}$. FIG. 18 illustrates a representative output timing sequence which may result. If No Forms Jam exists then the Sequencer outputs a Delayed Start Print pulse through NOR gate D14B. The delay accommodates the host machine's timing requirements of sampling the Start Print switch at some predetermined interval.

The Delayed Start Print pulse connects to a driver in logic block 175, and thereafter propagates through an interface circuitry 176 variously to panel 31 and also to block 165. At the conclusion of Delayed Start Print, the CO output of counter D9 inverts through D28 and inhibits the 32 HZ clock and maintains the Sequencer at zero until the next preset from the Sequencer logic 164a.

The Final Form Tracking logic block 161, consisting of shift register B12B and associated decoder gates, functions so as to terminate a Job Run only after the final forms frame has been registered upon the glass platen. It is disabled in the Prep and Job Recovery modes by keeping B12 in the reset state. In addition, a C RDY signal initializes B12 to zero prior to any Run mode. When in the Run mode C RDY changes to a low and B12 receives a Final Form Shift pulse train (equivalent to P.Q. Count) from logic block 164a. Each pulse in this train occurs at each initiation of forms movement of the material D. The Sequencer shifts in zeroes as long as B12's D input (End of Forms) stays low. But once it changes to a high, indicating an End of Forms, as determined by the sensors 86, 87, 88 previously described, the Sequencer becomes armed to deliver a Final Form Coinc condition.

Figure 19:
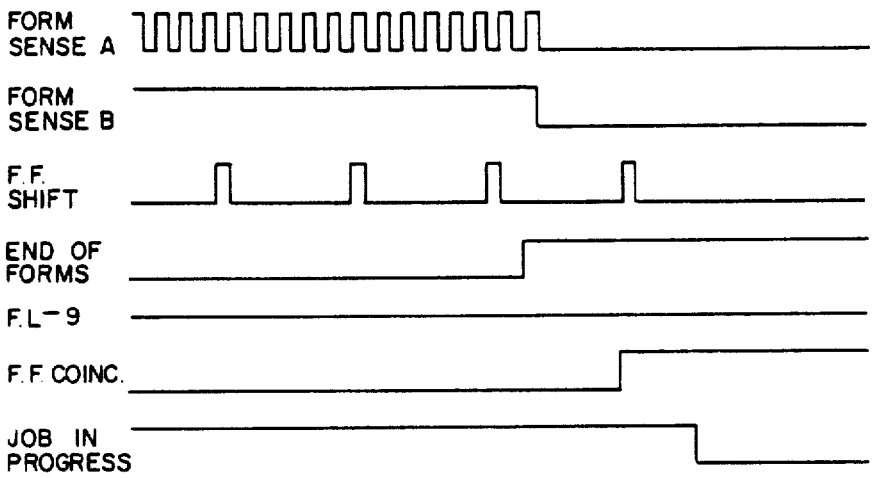

FIG. 19 shows that Form Sense A (Sensors 86, 87) detects web material feed holes 85 and generates a negative-going pulse for every hole detected. The other sensor Form Sense B, (Sensor 88) on the other hand, does not detect holes, due to being physically offset some distance from the edge of the material D and inside the path of the holes. It generates a high level whenever it senses the presence of the material. The functions of these sensors could be interchanged with identical result in the present invention by virtue of input gating arrangement provided in Jam Sensing logic 160b, by gates D19A, D20B, and C5A. In any event, the OR sensor function, $\overline{A}+\overline{B}$, generates a pulse train for sensed holes as the fanfold material D moves, whereas the AND function $\overline{A}\cdot\overline{B}$ assures a valid determinaion of No Forms, and in conjunction with Move (Not Halt) signal from block 167, production of End of Forms. In particular, NOR gate D20B in the Jam Sensing logic 160b outputs a high level depicting End of Forms and feeds this information to the date input of shift register B12. The various outputs of register B12 may be decoded programmably to eventually produce a Final Form Coinc signal, depending on the selection of Form Length as set by the switches 136, 137. It must be noted that the specific decoding equations for valid Coincidence generation provide particular solutions to a given geometry of the apparatus 40 and must therefore be adjusted to changes in geometry. The requirement of additional Move Cycles after the detection of End of Forms reflects a separation between registration edge 48 for the platen 14 and location of the sensors 86, 87, 88.

FIG. 19 shows an example of a Final Form Coinc for Form Length selection greater than or equal to 9 inches, for the apparatus 40 of the present invention. For this case, with occurrence of End of Forms, the next Final Form Shift pulse clocks the Shift Register B12, producing a high level at Q1, and thus generates Final Form Coinc through NAND gate C20C. This coincidence signal conditions logic block 162 to reset Job in Progress, as previously ascribed, which in turn causes B12 to reset.

Any Form Length selections of less than 6 inches requires three extra Move Cycles to move the last frame of the material into registration upon the platen. In this case, the Final Form Tracking Register B12 needs three Final Form Shift pulses to deliver a high level at Q3 and enable NAND gate C20A. The remaining Forms Length selections fall in the intermediate range, $6 \leqq$ panel length $< 9$. In this case, the Sequencer requires two extra Final Form Shift pulses to enable NAND gate C20B.

Equations 8, 9, and 10 establish the Form Length criteria and conditioning of decoder gates for the above cases, which represent a geometry in which sensing occurs in the forms path 18 inches in advance of the registration edge 48.

| | | |
|---|---|---|
| panel length $< 6 =$ | $\overline{(8)} \cdot (2 \oplus 4)$ | (8) |
| panel length $\geqq 9 =$ | $8 \cdot (4 + 2 + 1)$ | (9) |
| $6 \leqq$ panel length $< 9 =$ | $\overline{[8 \cdot 9]}$ | (10) |

Where 8, 4, 2, 1, represent weighted numbers assigned to binary data bits specifying the selection for Form Length, and in fact define frame length measurement in inches. These equations have been implemented within the Form Length Counter logic block 166a, utilizing the various gates, B7, C3A, C4B, C8A, and C8B (see FIG. 9e).

The Host Machine Signal Conditioning logic block 165, depicted in FIG. 9d, interfaces with the host machine and receives the following signals: (1) A Start Print, (2) A Stop Print, (3) A Ready, (4) A Flash (illumination), and (5) A Job Recovery and such additional signals as may be valuable. Of these five signals just identified, the first two control flip flops C16B (A Print); the third enables flip flops C17B and D27B (A Job in Being); the fourth presets counter C21 (A Flash Coincidence); and the fifth sets flip flop C17A (RPP). The last signal, Recover Proper Page (RPP), enables logic provisions to allow the operator to recover the proper panel of document material, following a jam condition within the host processor that requires such recovery, and it will be considered separately from the other four.

The circuit pertaining to the first four signals operates in two predominant patterns. First, in a normal situation, the operator actuates Start Print 142, the host machine flash illuminates a panel of the fanfold material a preselected number of times, and the material advances to the next position to present another frame on the platen. At this time the host machine receives a new Start Print Command, (as previously detailed), the flash illumination and the fanfold advance sequence repeats itself. The sequence continues until (1) the preselected Feed Quantity has been reached, or (2) the End of Forms condition occurs, promoting Forms Coincidence. In the second situation, the operator actuates Start Print as before and begins the sequence described above. Now, however, the operator actuates Stop Print during a flash sequence and the system must cease operation in rapid but orderly fashion.

FIG. 20 illustrates signal relationships for a partial sequence during the first situation of normal operation discussed above, and assumes that a copy quantity of seven was programmed. As indicated, A Start Print initiates the sequence by setting flip flop C16B (A Print), and simultaneously, A Ready by changing to a low, enables a sequenced latch pair composed of C17B and D27B which present slightly time-shifted replicas of A Job in Being (AJIB) to inputs of D14. Following a sequence of flash exposures, the host processor returns A Ready signal to a high, which passes low data from C28A rapidly through C17B and D27B in succession (clocked by a 1 KHz signal). It is at this high-to-low transition of AJIB that D14 becomes momentarily enables, its strobe pulse passing to NAND gate D24A. In addition, D24A receives A Print and the Carry Output signal from counter C21.

The down counter C21 is connected so that it remains at count zero with the Carry Output low, until it receives the first Flash pulse. Thereupon, it is preset to count"fifteen", causing the Carry Output to go high, and a downcount begins, clocked at 16 Hz. Since the counter, so clocked, requires a full second to reach zero and A Flash pulses arrive at ½ second intervals, in this design example, the Carry Output remains high for 15/16 second after the flashing pulse train has stopped, whereupon it returns low and inhibits the 16 Hz clock at C29A to C21.

The significance of these variously developed signals is in their combined effect through gate D24A, for the purpose of generating a Flash Coincidence signal, which is used to develop Job Cycle strobe, and thus initiate a form indexing cycle. In fact, the C21 Carry Out established a time window following a flashing sequence within which A Ready must arrive, as propagated by D14, in order to produce Flash Coincidence. If flash sequence is terminated by A Stop Print, A Print is immediately set low, disabling D24A. Alternatively, if flash train is interrupted by any jam, fault, or malfunction in the host processor, A Ready is not produced, but rather an appropriate instructive display is presented instead. It is interesting that a valid emulation for flash (copy quantity) coincidence has hereby been developed without any information regarding copy quantity program being communicated from the host processor. It is to be noted, however, that this exemplary technique applies to a particular system configuration, and that alternate interfaces may be easily devised for various other configurations, so that the broadest application of the present invention is not, in any fashion, restricted by the just described interfacing method.

As has been heretofore mentioned, a jam or malfunction in the host reproduction machine may result in a loss of some partially processed impressions, possibly including such impressions from previously registered documents. These earlier documents must, in such event, be returned to the platen in order to recover their lost impressions and thereby maintain complete Job integrity.

For the case of the Job Recovery mode of operation, the host machine initially generates a Job Recovery signal which sets flip flop C17A RPP (Recover Proper Panel). When this occurs, the operator must initiate a recovery procedure, first by rectifying the processor malfunction, and then by returning to correct document frame.

When C17A is set high, it performs the following functions:

1. It enables the Form Feed Reverse logic on command to back up the forms one position for each depression of the Reverse switch 132.

2. It enables the Form Feed Advance logic in single step mode, also.

2. It inhibits C Ready.

4. It inhibits logic block 164B from producing Delayed Start Print.

When the operator commences the Job Recovery procedure, a Document Number is initially presented on the host machine panel 31, in display element 140a, selected by switch 140f. This number indicates the last document to undergo a complete reproduction process and delivery to intended output location. The continuous document material feeder 40 displays a number on suitable digital display 146 which indicates the number of the panel or form page currently registered on the platen, being produced, starting from the first panel in the Job counted as page 1. The Job Recovery switch 147, on panel 31, may now be depressed, causing display 140a to automatically update to the Document Number not completely processed, as calculated by controller 31a. Since the new number is in all cases less than the old, forms must be reversely positioned. By actuating the Reverse switch 132 an appropriate number of times, the page number displayed by the forms feeder display 146 may be accordingly decreased in single page steps to the number shown by the host display 140a. When the two match, and the forms material is pulled taught in the apparatus 40, Job Recovery is completed and normal operation resumed, upon a Start Print initiation.

Before discussing the Forms Jam Detection Detector circuit 176, further information with regard to forms motion and forms sensor outputs will be described. It will be assumed that neither Recover Page or End of Forms shall occur, for simplicity.

A. When in the Feed Run mode of operation the following hold true:

1. The step clock generator produces 100 pulses per inch of panel or material movement. Therefore, (Step Clock)/100 equals 1 pulse per inch of forms movement and (Step Clock)/10 equals 10 pulses per inch of forms movement.

2. Since the fanfold material has 2 feed holes per inch, each sensor 86 or 87 generates 2 pulses per inch of forms movement provided that the feed holes pass within the respective sensor's path. Thus, Frequency output of sensor 86$=F_A=2$ ppi Frequency output of sensor 87$=F_B=2$ ppi, phase shifted ¼ inch, ∴180°, from $F_A$.

And, when both sensors detect feed holes:

$F_T=F_A$ plus $F_B=4$ ppi

3. FIG. 21 illustrates the relationship between (Step Clock)/100, $F_A$, $F_B$, and $F_T$.

4. While in a Feed Run mode, Move stays high.

B. When a Jam occurs, the following holds true:

1. The Tractor Module functions but the forms may slow down, or completelly stop. Thus, FA→0, FB→0, and $F_T$→0, whereas Step Clock/100 continues at 1 ppi.

2. Either Forms Sense A by sensors 86, 87 of Forms Sense B by sensor 88, or both, detects forms, thereby inhibiting End of Forms.

3. Move=high.

FIG. 22 illustrates those logic elements which are part of the I/O Conditioning logic 160 and which form the Forms Jam Detection logic circuit. Essentially, it consists of some conditional gating, a frequency discriminator A16, a down counter D21, and a Jam flip flop D27A.

During a Run (Move) mode and normal forms movement, NAND gate D19 combines $F_A$ and $F_B$ to output FA, FB, or FT as described above The frequency discriminator A16 receives this pulse train and compares it to a reference frequency, (Step Clock)/100. For normal operations, the compared frequency exceeds the reference frequency by a ratio of 2:1 or 4:1. Under these circumstances A16 outputs a high level and inhibits counter D21 from counting and therefore prevents a low Carry Output, which through gate C4A, would set the C jam flip flop D27A.

An occurrence of a jam anywhere in the material feeder 40 causes the frequencies FA, FB, or FT to decrease at the output of D19. The frequency discriminator A16 compares the pulse train frequency from D19 to the frequency of Step Clock/100, and whenever the latter exceeds the former, A16 outputs a low level that enables counter D21 through C28. Thereafter, the counter clocked by (Step Clock)/10, outputs a Carry (low) pulse when it reaches zero, but only if the discriminator output remains low for the equivalent period for 1.5 inches of forms motion. With NAND gate C4 enabled, the pulse proceeds to set D27A and establishes a C Jam. This condition enables Stop Print Command and inhibits Delayed Start Print of logic block 164B. Flip flop D27A resets after the jam condition has been cleared up and tractor cover closed.

By way of an example of operation for the apparatus and system of the present invention, in a typical reproduction run, it will be assumed that the fanfold material D to be handled has a large number of panels and that the operator desires that the 20th frame or panel is to be the beginning of the run and that 80 panels thereafter are to be copied. It is also desired that there be five copies of each of the panels. The initial step to be taken with apparatus 40 in Prep Mode, and form leader threaded and registered, is to set the Feed Quantity switches 133, 134, 135 to indicate 20, as shown in FIG. 7. The operator next actuates the Advance switch 131 until the drive tractors 56 terminate their operation. This will occur when the 20th panel, which becomesthe Start Page, has been registered upon the platen. As previously stated, actuation of the Advance switch while the system is in the Prep mode permits advancing the material D without making copies. The next step involves resetting the switches 133, 134, 135 to indicate 80 and the actuation of the Auto Switch 138 which conditions the system for continuous automatic operation, when activated, by Start Print until the 80th panel has been moved to the platen and copying thereof completed. The operator next manipulates the keyboard 140 for programming the number, 5, of copies of each panel to be produced. The final step for initiating the reproduction run is to actuate the Start Print button 142. This step effects the activation of the system, and as each panel is copied the preset number of times, which, as previously stated, is to be 5 copies, the material advances one panel. The copy sheets are advanced to the sorter 13 whereat collation into consecutively numbered sets takes place.

If the operator wishes to produce duplex or two-sided copies, the Duplex switch button 144 is actuated and then the above description is followed. It is understood that the logic within the controller 150 is established so as to automatically determine, upon production of the next-to-last document in a Job run, whether the last document is an odd, or even number page, and therefore whether Duplex must be deselected, or not, respectively as required. When the next to the last page is made and the last page is determined to be odd, deselection of Duplex copying is automatically arranged and thereafter, regeneration of the Start Print command is accomplished by controller 150 so that the last page of the run will be produced, and the Job Completed automatically.

If the operator desires to reproduce the entire length of the web material, the Feed Quantity switches 133, 134, 135 are set to zero and, as before, the Auto switch is actuated. The fanfold feeder apparatus 40 is then set to produce the number of copies of each panel or frame of the material D as selected in the host machine keyboard 140 until the document stack is completed, a jam shutdown occurs or the operator intervenes.

With the Feed Quantity set to zero, and the Single mode selected as by actuating the Single switch 139, and during a reproduction Job, the fanfold material is advanced a frame-at-a-time, for each actuation of Start Print on the host processor. After each frame is exposed, the host machine will cycle out, the material will advance to the next frame and stop. With Feed Quantity still set at zero, actuating the Advance switch will advance the material one frame, without producing a copy.

From the foregoing description, it will be apparent that the present invention enhances the field of reproducing computer fanfold printout material by innovative arrangement of sub-assemblies and circuitry utilized to transport the material relative to a host machine. While the invention has been described with reference to the structure disclosed, it is not confined to the details set forth, but is intended to cover such modifications or changes as may come within the scope of the following claims.

What is claimed is:

1. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frames positioned on an exposure platen, the combination of:

control system associated with the tractor drive for advancing the web to position the frames upon the platen manually or automatically, sensing means arranged in the path of movement of the web and adapted to sense the openings along an edge of the web material, circuit means connected to said sensing means and arranged to produce a frequency of pulses in accordance with the sensed rate of openings movement, and control means associated with said circuit means for effecting the shutdown of the machine in the event said frequency of pulses deviates from a reference frequency.

2. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frames positioned on an exposure platen, the combination of:

control system associated with the tractor drive for advancing the web to position the frames upon the platen manually or automatically, sensing means arranged in the path of movement of the web and adapted to sense the openings along an edge of the web material, means cooperable with said sensing means and arranged to detect the movement of the openings during movement of the material, and control means associated with said last named means for effecting the shutdown of the machine in the event said movement of the openings is not detected when the control system is disposed for such movement.

3. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frames positioned on an exposure platen, the combination of:

control system associated with the tractor drive for advancing the web to position the frames upon the platen manually or automatically, sensing means arranged in the path of movement of the web and adapted to sense the openings along an edge of the web material, means cooperable with said sensing means and arranged to determine the end of the material and, after a predetermined time period to effect the shutdown of the machine.

4. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frames positioned on an exposure platen, the combination of:

control system associated with the tractor drive for advancing the web to position the frames upon the platen manually or automatically, sensing means arranged in the path of movement of the web and adapted to sense the openings along an edge of the web material, means cooperable with said sensing means and arranged to determine the end of the material in accordance with the number of openings in the material between the sensing means and a predetermined position in the path of movement of the material.

5. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frames positioned on an exposure platen, the combination of:

control system associated with the tractor drive for advancing the web to position the frames upon the platen manually or automatically, sensing means arranged in the path of movement of the web and adapted to sense the openings along an edge of the web material, means cooperable with said sensing means and arranged to determine the end of the material in accordance with the number of frame sections between the sensing means and a predetermined position in the path of movement of the material.

6. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frame positioned on an exposure platen, the combination of:

control system associated with the tractor drive for advancing the web to position the frames upon the platen manually or automatically, sensing means arranged in the path of movement of the web and adapted to sense the openings along an edge of the web material, means cooperable with said sensing means and arranged to coordinate the number of the openings in the edge of the material with the number of frame sections between the sensing means and a predetermined position in the path of movement of the material to determine the end thereof.

7. In a reproduction machine adapted to handle document material in the form of a computer fanfold web consisting of a plurality of frame sections and being formed with equally spaced openings along one or both edges for cooperation with a tractor drive for imparting movement of the web, the machine having a processor for reproducing copies of the frames positioned on an exposure platen, the combination of:

control system associated with the tractor drive for advancing the web to position the frames upon the platen manually or automatically, sensing means arranged in the path of movement of the web and adapted to sense the openings along an edge of the web material, means cooperable with said sensing means and arranged to coordinate the number of the openings in the edge of the material with the size of the frame sections and the number of frame sections between the sensing means and a predetermined position in the path of movement of the material to determine the end thereof.

8. In a reproduction machine adapted to handle document material in the form of a computer fanfold web consisting of a plurality of frame sections cooperable with a tractor drive for imparting movement of the web, the machine having a processor for reproducing copies of the frames positioned on an exposure platen, and a control system associated with the tractor drive for advancing the web to position the frames upon the platen manually or automatically, the combination of:

sensing means arranged in the path of movement of the web and adapted to sense the movement of the web material, circuit means connected to said sensing means and arranged to produce a frequency of pulses in accordance with a predetermined speed of movement of the material, and control means associated with said circuit means for effecting the shutdown of the machine in the event said frequency of pulses deviates from a reference frequency.

9. In a reproduction machine adapted to handle document material in the form of a computer fanfold web consisting of a plurality of frame sections cooperable with a tractor drive for imparting movement of the web, the machine having a processor for reproducing copies of the frames positioned on an exposure platen, and a control system associated with the tractor drive for advancing the web to position the frames upon the platen manually or automatically, the combination of:

sensing means arranged in the path of movement of the web and adapted to sense the movement of the web material, means cooperable with said sensing means and arranged to effect the shutdown of the machine in the event the speed of movement of the material deviates from a predetermined speed of movement.

*10. In a reproduction machine adapted to handle document material in the form of a computer fanfold web consisting of a plurality of frame sections and being formed with equally spaced openings along one or both edges, the machine having a drive means for imparting movement of the web and a processor for reproducing copies of the frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*circuit means connected to said sensing means and arranged to produce a frequency of pulses in accordance with the sensed rate of openings movement, and control means associated with said circuit means for effecting the shutdown of the machine in the event said frequency of pulses deviates from a reference frequency.*

*11. In a reproduction machine adapted to handle document material in the form of a computer fanfold web consisting of a plurality of frame sections and being formed with equally spaced openings, along one or both edges, the machine having a drive means for imparting movement of the web and a processor for reproducing copies of the frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*means cooperable with said sensing means and arranged to detect the movement of the openings during movement of the material, and control means associated with said last named means for effecting the shutdown of the machine in the event said movement of the openings is not detected when the control system is disposed for such movement.*

*12. In a reproduction machine adapted to handle document material in the form of a computer fanfold web consisting of a plurality of frame sections and being formed with equally spaced openings along one or both edges, the machine having a drive means for imparting movement of the web and a processor for reproducing copies of the frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*means cooperable with said sensing means and arranged to determine the end of the material and, after a predetermined time period to effect the shutdown of the machine.*

*13. In a reproduction machine adapted to handle document material in the form of a computer fanfold web consisting of a plurality of frame sections and being formed with equally spaced openings along one or both edges, the machine having a drive means for imparting movement of the web and a processor for reproducing copies of the frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*means cooperable with said sensing means and arranged to determine the end of the material in accordance with the number of openings in the material between the sensing means and a predetermined position in the path of movement of the material.*

*14. In a reproduction machine adapted to handle document material in the form of a computer fanfold web consisting of a plurality of frame sections and being formed with equally spaced openings along one or both edges, the machine having a drive means for imparting movement of the web and a processor for reproducing copies of the frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*means cooperable with said sensing means and arranged to determine the end of the material in accordance with the number of frame sections between the sensing means and a predetermined position in the path of movement of the material.*

*15. In a reproduction machine adapted to handle document material in the form of a computer fanfold web consisting of a plurality of frame sections and being formed with equally spaced openings along one or both edges, the machine having a drive means for imparting movement of the web and a processor for reproducing copies of the frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*means cooperable with said sensing means and arranged to coordinate the number of the openings in the edge of the material with the number of frame sections between the sensing means and a predetermined position in the path of movement of the material to determine the end thereof.*

*16. In a reproduction machine adapted to handle document material in the form of a computer fanfold web consisting of a plurality of frame sections and being formed with equally spaced openings along one or both edges, the machine having a drive means for imparting movement of the web and a processor for reproducing copies of the*

*frames positioned on an exposure platen, the combination of:*

*control system associated with the drive means for advancing the web to position the frames upon the platen manually or automatically,*

*sensing means arranged in the path of movement of the web and adapted to sense the openings along an edge of the web material,*

*means cooperable with said sensing means and arranged to coordinate the number of the openings in the edge of the material with the size of the frame sections and the number of frame sections between the sensing means and a predetermined position in the path of movement of the material to determine the end thereof.*

*17. In a reproduction machine adapted to handle document material in the form of a computer fanfold web consisting of a plurality of frame sections, the machine having drive means for imparting movement of the web and a processor for reproducing copies of the frames positioned on an exposure platen, and a control system associated with the drive means for advancing the web to position the frames upon the platen manually or automatically, the combination of:*

*sensing means arranged in the path of movement of the web and adapted to sense the movement of the web material,*

*circuit means connected to said sensing means and arranged to produce a frequency of pulses in accordance with a predetermined speed of movement of the material, and control means associated with said circuit means for effecting shutdown of the machine in the event said frequency of pulses deviates from a reference frequency.*

*18. In a reproduction machine adapted to handle document material in the form of a computer fanfold web consisting of a plurality of frame sections, the machine having drive means for imparting movement of the web, the machine having a processor for reproducing copies of the frames positioned on an exposure platen, and a control system associated with the drive means for advancing the web to position the frames upon the platen manually or automatically, the combination of:*

*sensing means arranged in the path of movement of the web and adapted to sense the movement of the web material,*

*means cooperable with said sensing means and arranged to effect the shutdown of the machine in the event the speed of movement of the material deviates from a predetermined speed of movement.*

* * * * *